United States Patent [19]

Skurka

[11] Patent Number: 5,397,280
[45] Date of Patent: Mar. 14, 1995

[54] SYSTEM PHASING OF OVERHEAD CAM ENGINE TIMING CHAINS

[75] Inventor: John C. Skurka, Brooktondale, N.Y.

[73] Assignee: Borg-Warner Automotive, Inc., Sterling Heights, Mich.

[21] Appl. No.: 131,977

[22] Filed: Oct. 4, 1993

[51] Int. Cl.$^6$ .............................................. F16G 13/04
[52] U.S. Cl. ..................................... 474/206; 474/156
[58] Field of Search ................. 474/152, 153, 156-158, 474/206, 210, 212-217

[56] References Cited

U.S. PATENT DOCUMENTS

| | | |
|---|---|---|
| 579,742 | 3/1897 | Cottie et al. . |
| 637,056 | 11/1899 | Whitney . |
| 959,046 | 5/1910 | Belcher . |
| 1,201,748 | 10/1916 | Luce .................... 474/156 |
| 1,835,406 | 12/1931 | Kirsten ................. 474/156 |
| 3,029,654 | 4/1962 | Hill . |
| 3,377,875 | 4/1968 | Sand . |
| 3,495,468 | 2/1970 | Griffel . |
| 4,342,560 | 8/1982 | Ledvina et al. . |
| 4,758,210 | 7/1988 | Ledvina . |
| 4,776,829 | 10/1988 | Yamamuro et al. . |
| 4,832,668 | 5/1989 | Ledvina et al. . |
| 4,911,682 | 3/1990 | Ivey et al. . |
| 4,915,675 | 4/1990 | Avramidis . |
| 4,938,737 | 7/1990 | Yamamuro . |
| 5,170,883 | 12/1992 | Ledet et al. . |
| 5,215,505 | 6/1993 | Sugimoto et al. . |

FOREIGN PATENT DOCUMENTS

| | | |
|---|---|---|
| 2-118230 | 5/1990 | Japan . |
| 56-4780 | 1/1981 | Japan . |
| 62-258240 | 11/1987 | Japan . |
| 63-222929 | 9/1988 | Japan . |
| 1-247858 | 10/1989 | Japan . |
| 1-266338 | 10/1989 | Japan . |
| 1-316544 | 12/1989 | Japan . |
| 2-62445 | 3/1990 | Japan . |
| 2-76944 | 3/1990 | Japan . |
| 3-28348 | 3/1991 | Japan . |
| 4-262153 | 9/1992 | Japan . |
| 5-17251 | 3/1993 | Japan . |

OTHER PUBLICATIONS

A publication dated approximately 1978 from *I. Mech. E*, entitled "Roller Chain and Camshaft Drives.".
A publication entitled "Ferguson Formula All-Wheel Control," *Motor*, Jul. 29, 1972.
A publication entitled "Roller Chain as a Transfer Drive for the Automobile," ASME Paper, Aug. 1980.

*Primary Examiner*—Michael Powell Buiz
*Attorney, Agent, or Firm*—Willian Brinks Hofer Gilson & Lione

[57] ABSTRACT

A chain and sprocket system includes a plurality of chains and phased or offset sprockets. The transmission system includes a random or hybrid chain with the offset sprockets. The timing system can include single or dual overhead camshafts, with phasing of the crankshaft sprockets and camshaft sprockets. The initial contacts of each chain assembly with the sprockets are phased or offset with respect to one another.

5 Claims, 15 Drawing Sheets

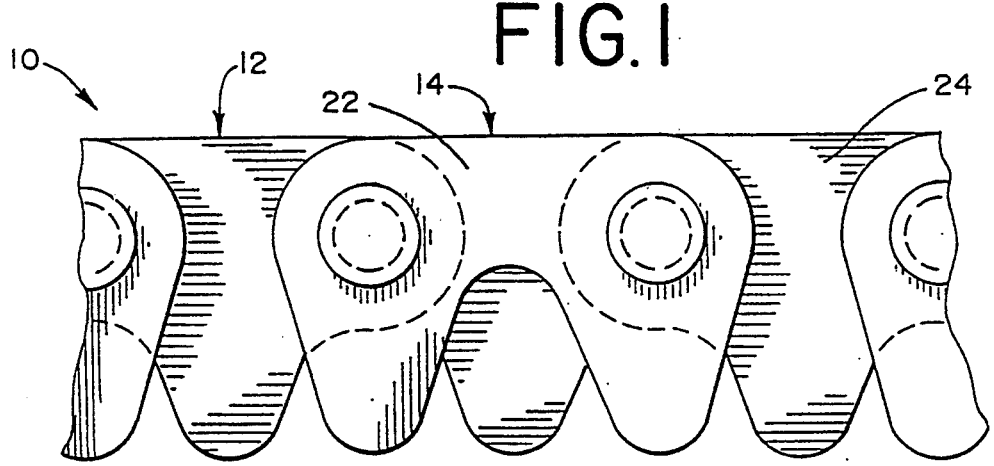
FIG. 1
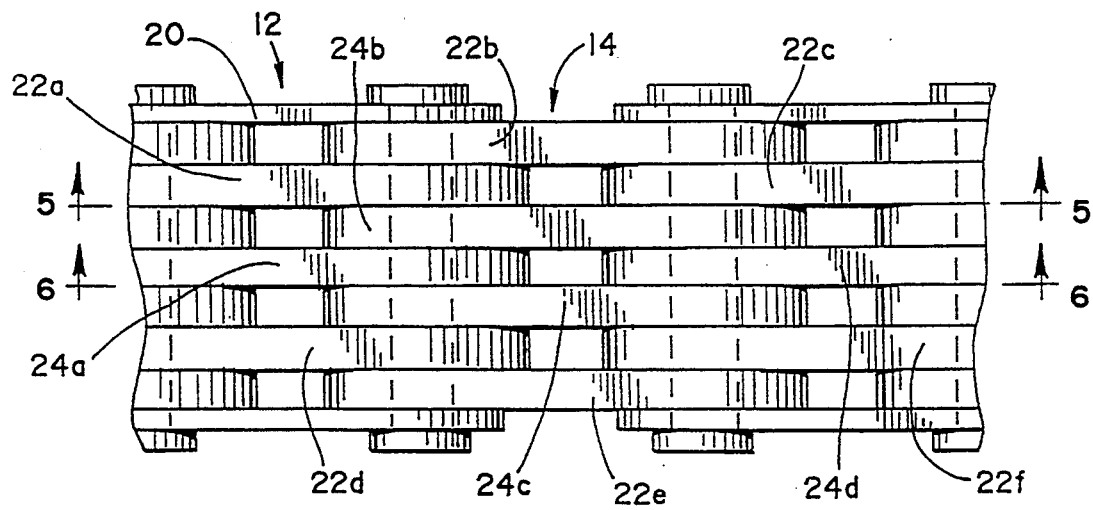
FIG. 2
FIG. 3
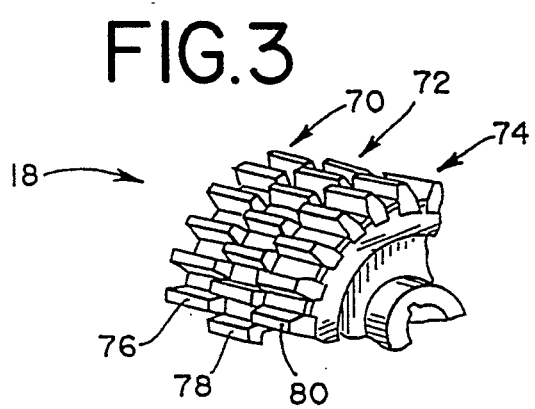
FIG. 4
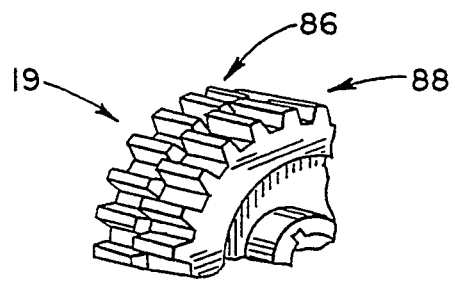

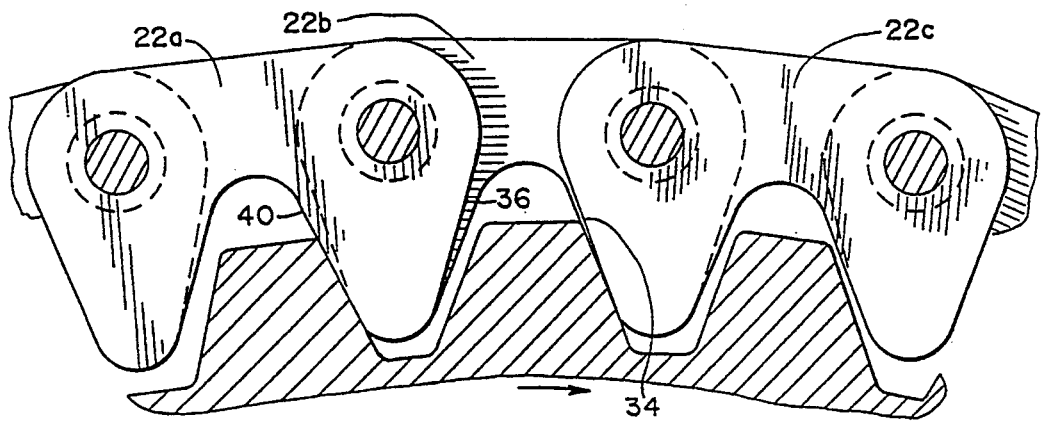
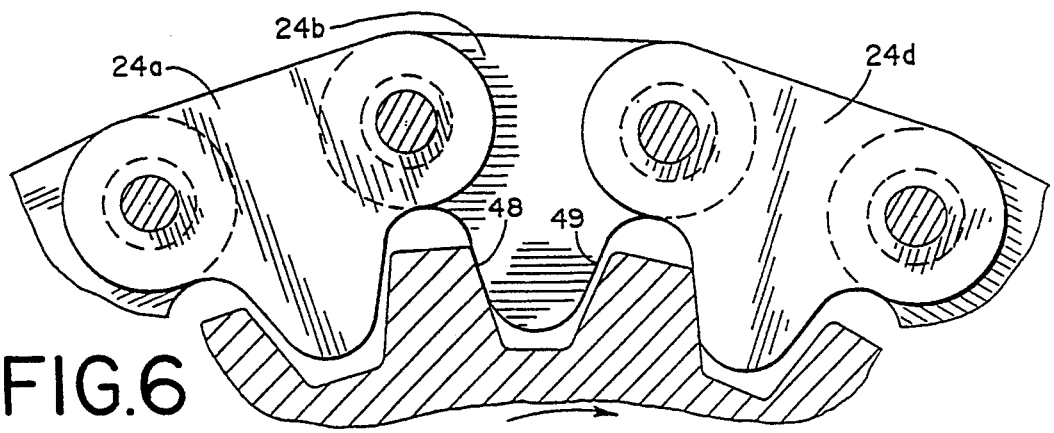
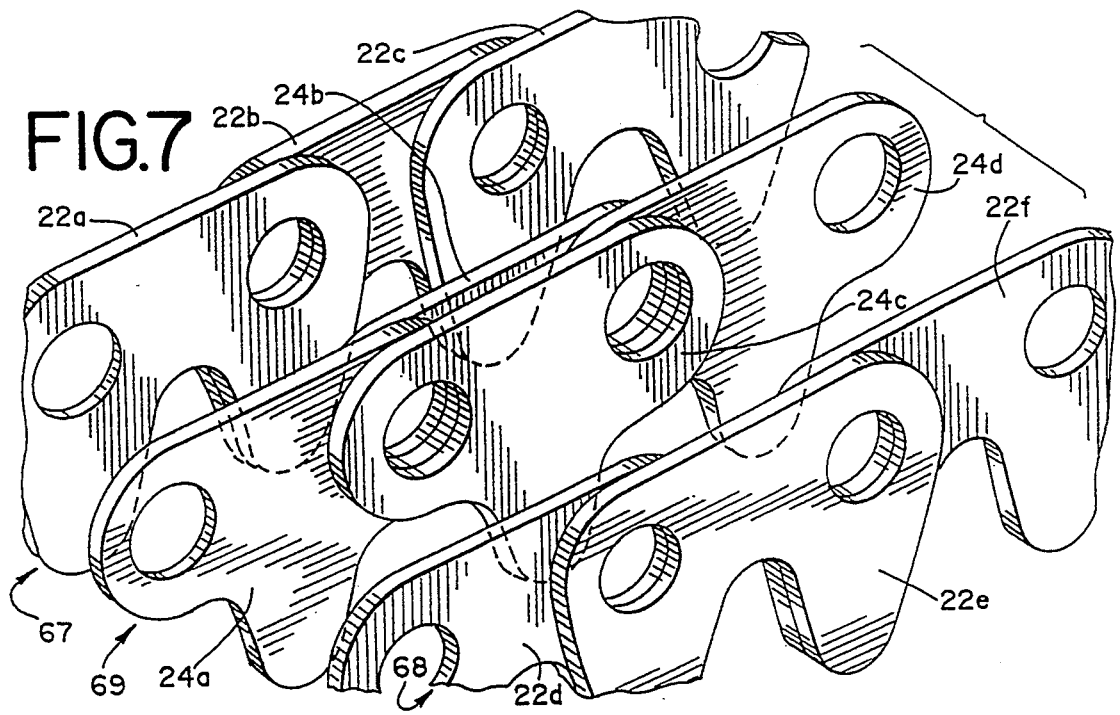

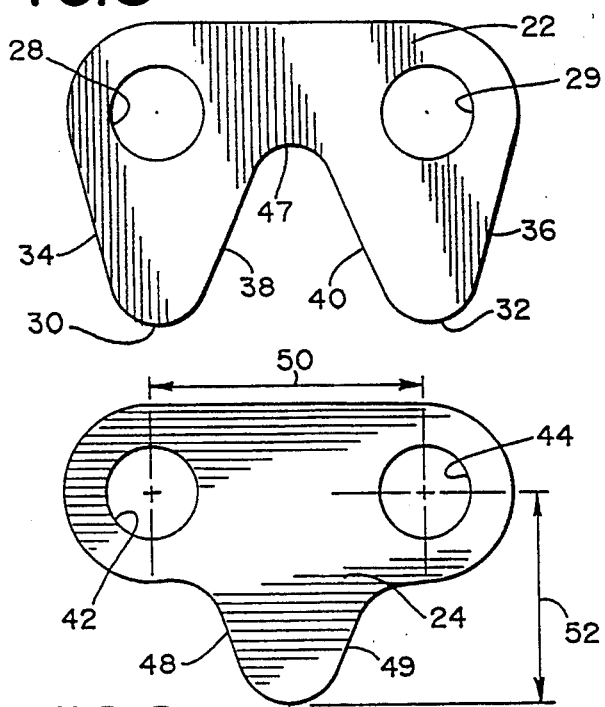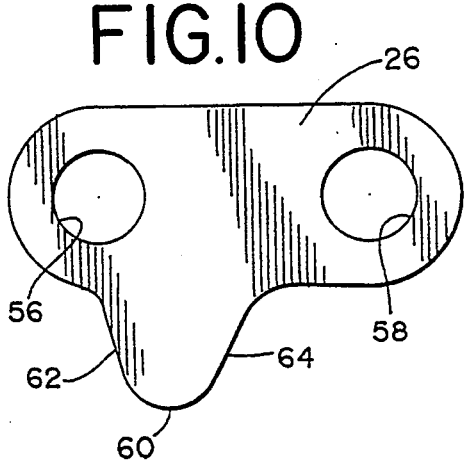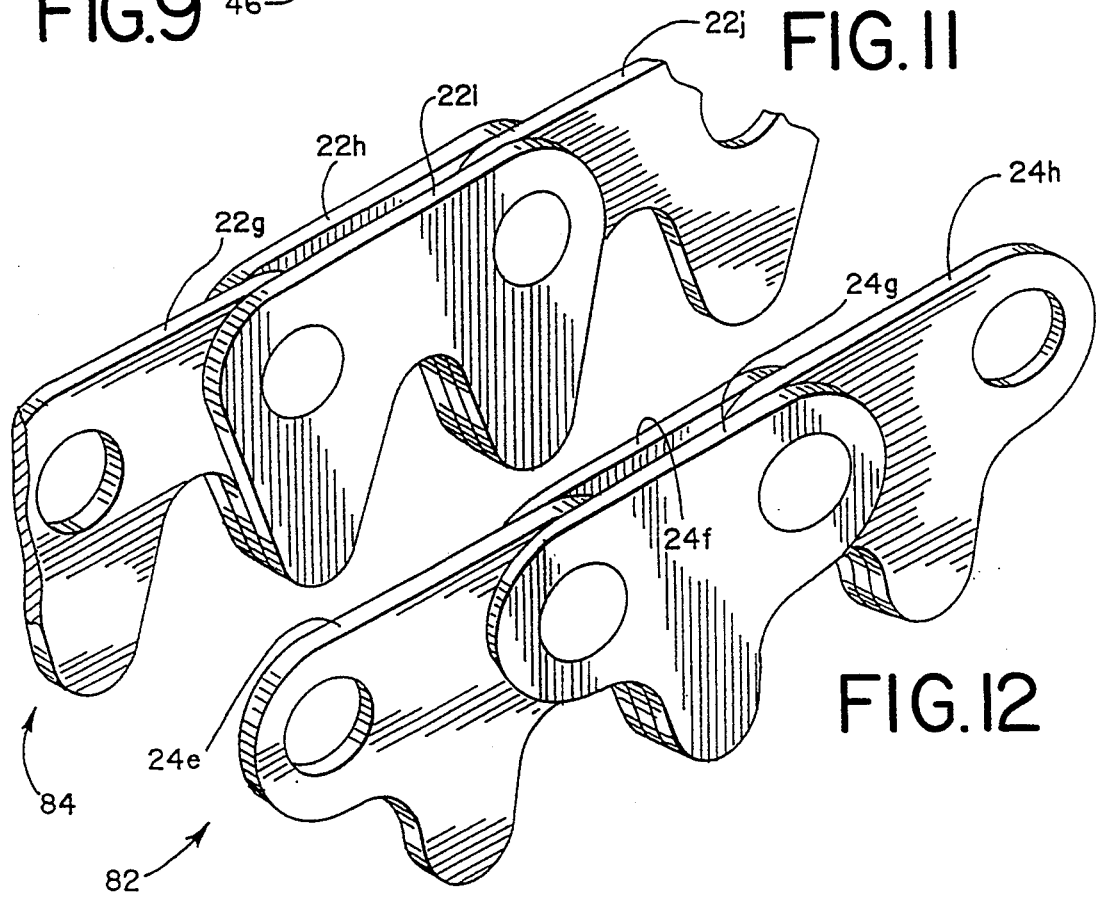

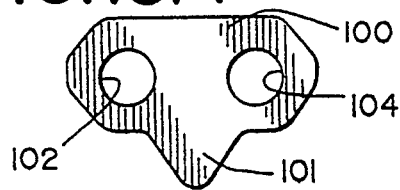
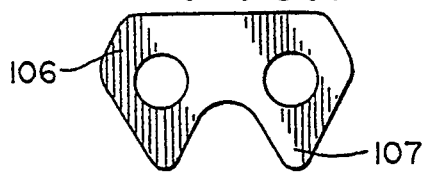
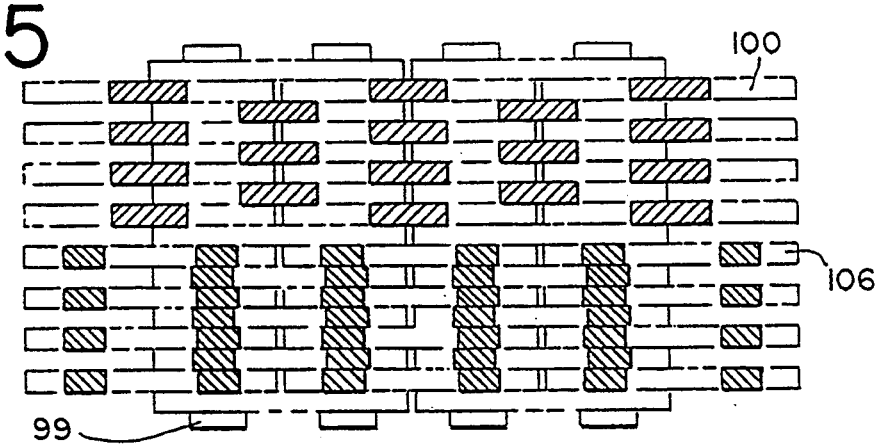
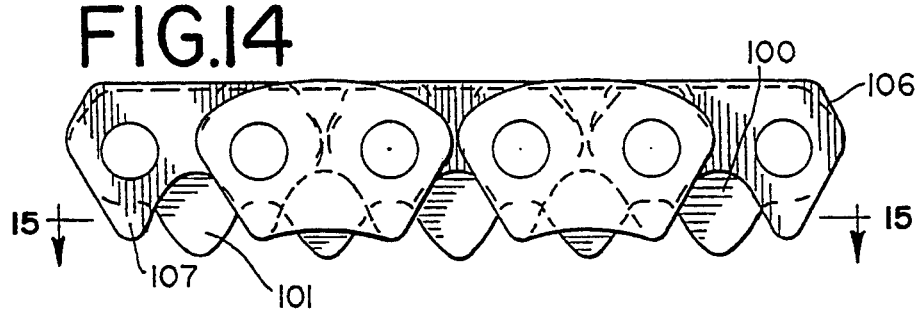
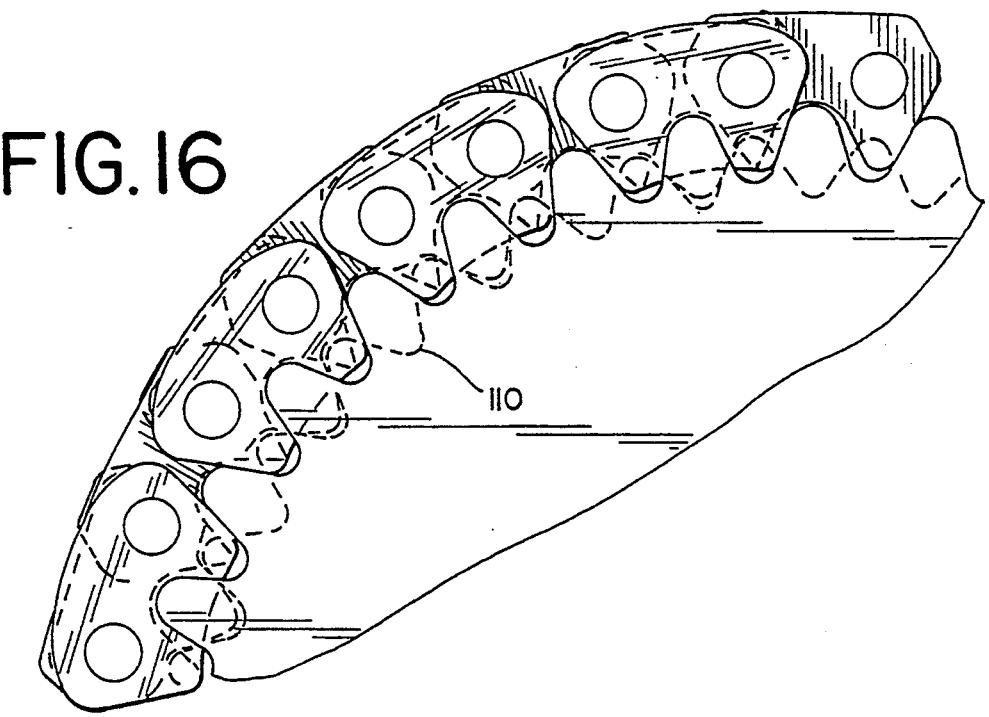

FIG.23
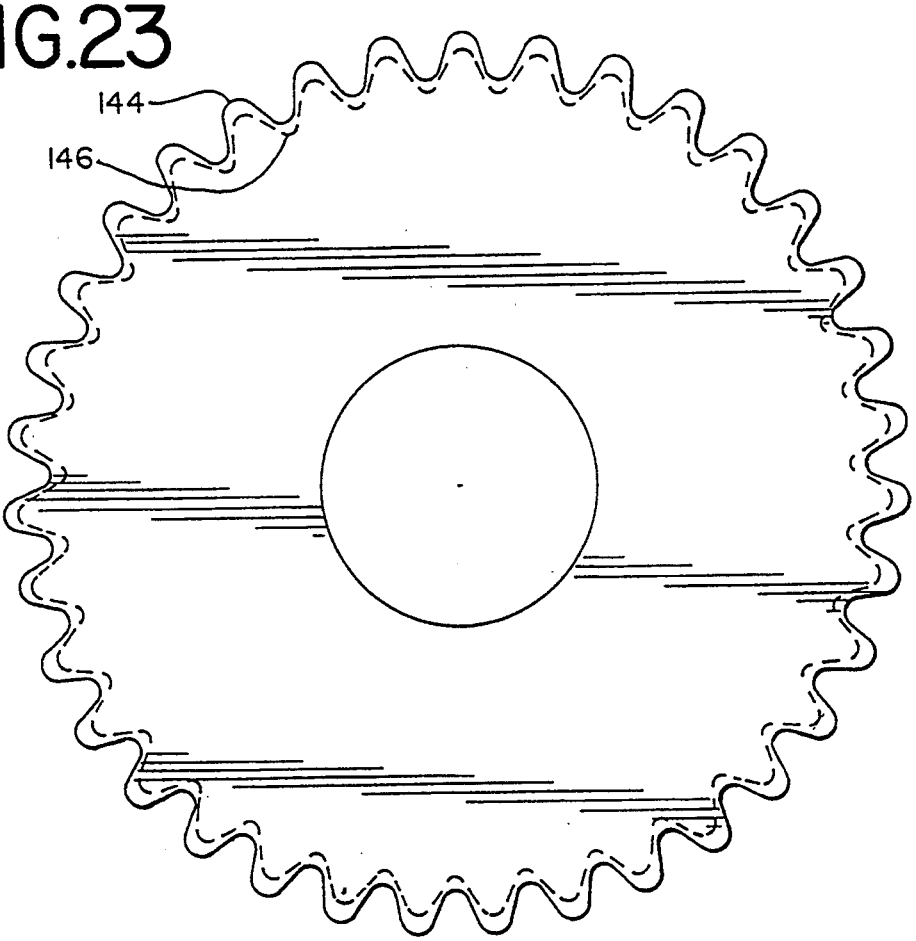
FIG.21A
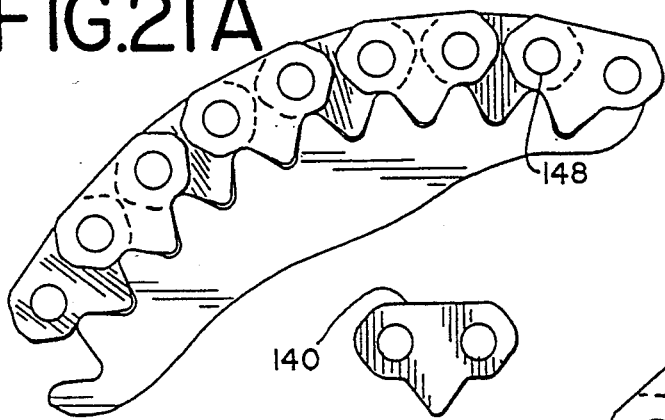
FIG.22A
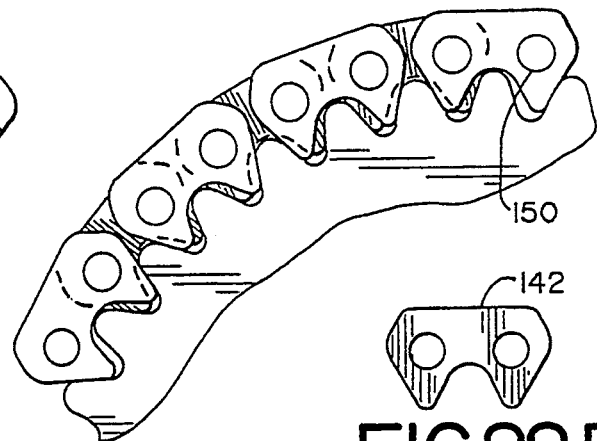
FIG.21B
FIG.22B
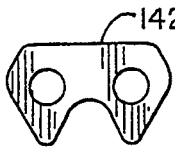

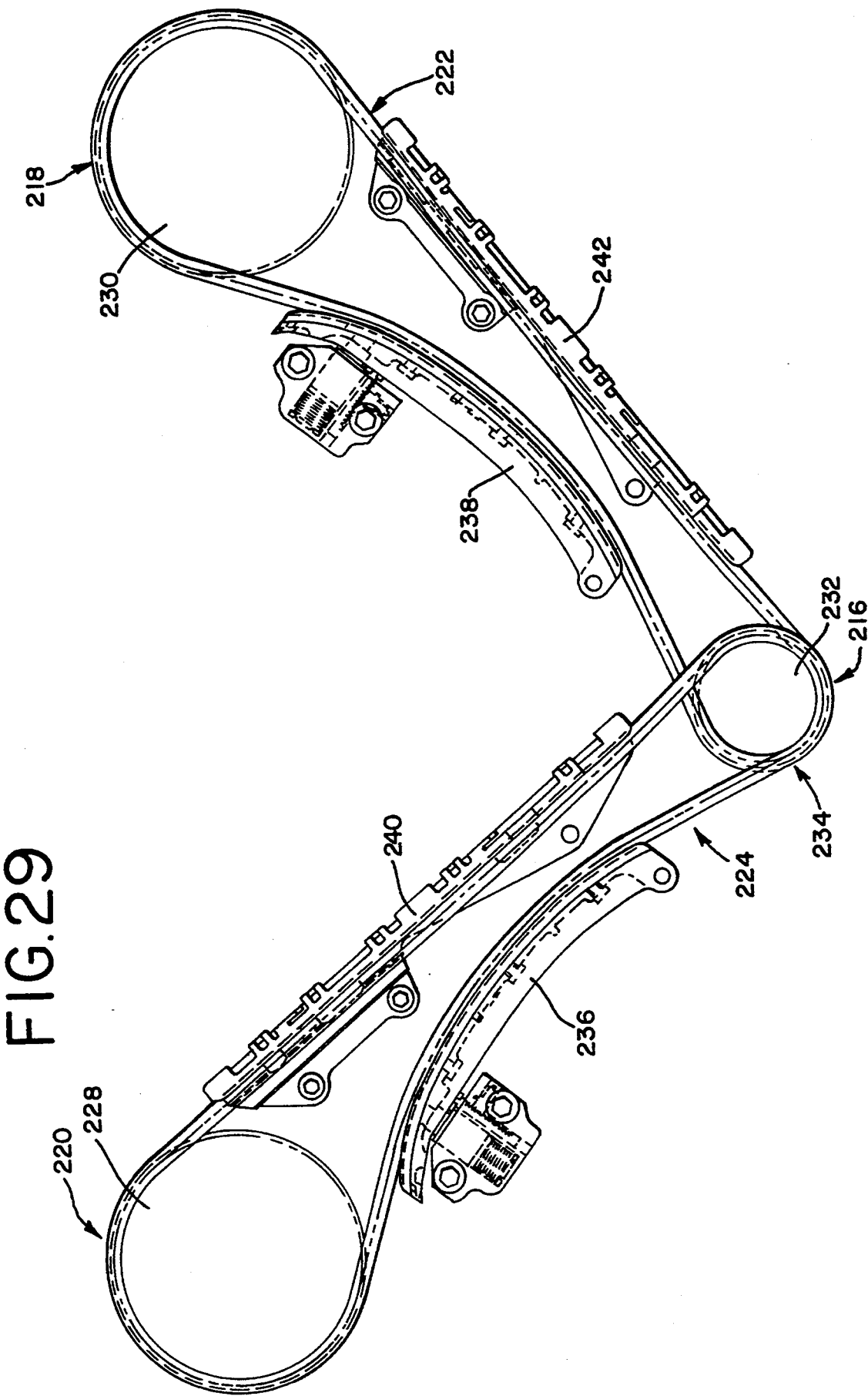

FIG.34A
FIG.34B
FIG.34C
FIG.34D
FIG.34E
FIG.34F
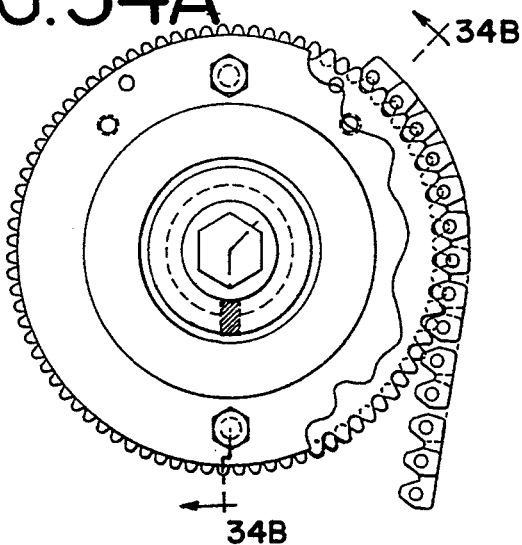
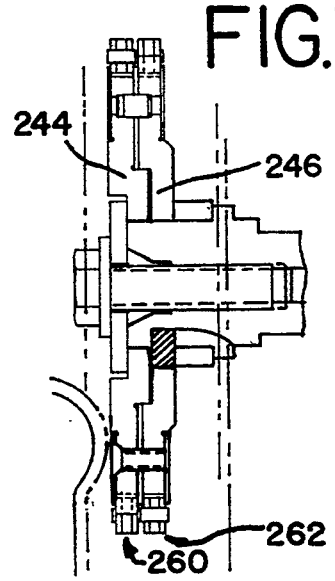
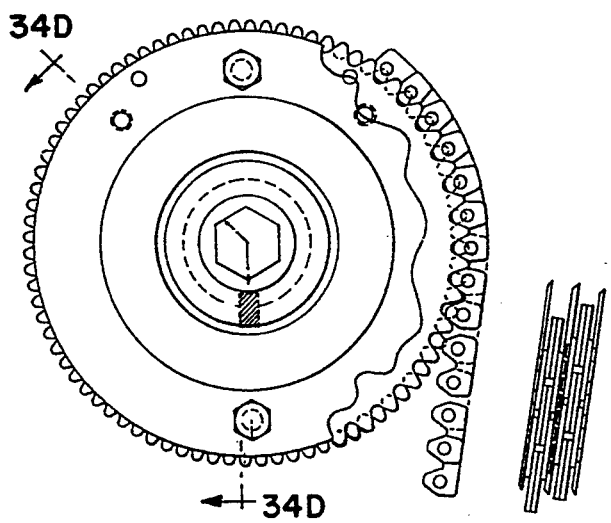
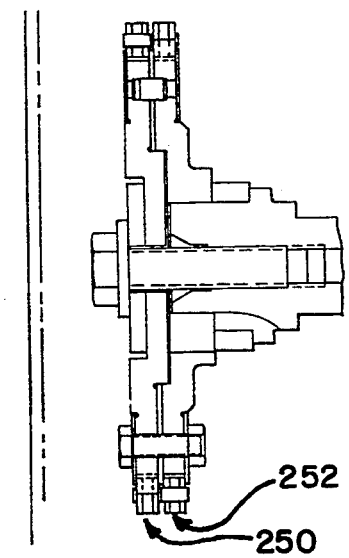
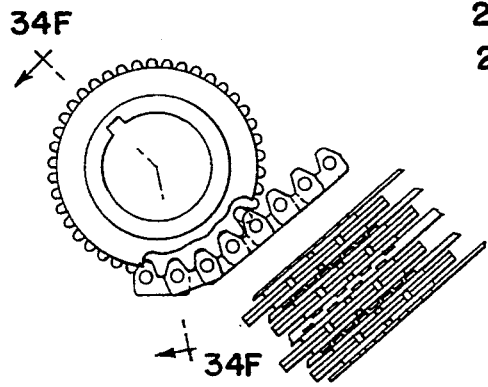
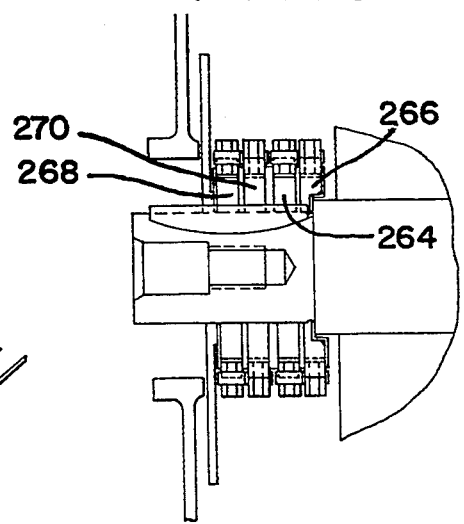

SYSTEM PHASING OF OVERHEAD CAM ENGINE TIMING CHAINS

BACKGROUND OF THE INVENTION

This application relates to the subject matter of U.S. application Ser. No. 08/131,473, filed Oct. 4, 1993, which is a continuation-in-part of U.S. application Ser. No. 07/885,194, filed May 19, 1992, entitled "Phased Chain Assemblies."

The present invention relates generally to power transmission chains. The invention has particular application to power transmission chains of the inverted tooth or silent chain variety, which are used in engine timing applications as well as in the transfer of power from a torque converter to a transmission or in a transfer case of a four-wheel drive vehicle.

The invention relates to phasing of the chain assemblies and the sprockets to modify the impact noise spectrum and chordal action noise spectrum. Specifically, the invention includes the use of timing chains in conjunction with phased sprockets to alter the noise spectra in an engine timing system. The invention also includes the use of random chains in conjunction with phased sprockets to alter the noise spectra.

Power transmission chains are widely used in the automotive industry. Such chains are used for engine timing drives as well as for the transfer of power from the torque converter to the transmission or for the transfer of power in a transfer case. Power transmission chains are also widely used in industrial applications.

One type of power transmission chain is referred to as "silent chain". Such chain is formed of interleaved sets of inverted tooth links. A set or rank of links is assembled from several links positioned alongside of or adjacent to each other. The links are connected by pivot means, which are typically round pins received in a pair of apertures. An example of silent chain is found in U.S. Pat. No. 4,342,560, which is incorporated herein by reference.

Conventional silent chains typically include both guide links and inverted tooth links. The guide links are positioned on the outside edges of alternate sets of links. The guide links typically act to position the chain laterally on the sprocket. Guide links typically do not mesh with the sprocket.

The inverted tooth links, or sprocket engaging links, provide the transfer of power between the chain and sprocket. Each inverted tooth link typically includes a pair of apertures and a pair of depending toes or teeth. Each toe is defined by an inside flank and an outside flank. The inside flanks are joined at a crotch. The inverted tooth links are typically designed so that the links contact the sprocket teeth to transfer power between the chain assembly and the sprocket. The inverted tooth links or driving links contact the sprocket teeth along their inside link flanks or their outside link flanks or combinations of both flanks. The contacts between the links and the sprocket teeth can be of the type which provide a power transfer, or can be of the nature of an incidental contact, or can include root contact or side contact.

A conventional silent chain drive is comprised of an endless silent chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket mounted on the camshaft. The rotation of a camshaft is thus controlled by and dependent on the rotation of the crankshaft through the chain. A chain for an engine timing drive application is shown in U.S. Pat. No. 4,758,210, which is incorporated herein by reference.

A conventional chain drive may include a chain assembly of extended width in order to provide a chain of greater strength. Alternatively, two chain assemblies may be placed side-by-side between pairs of sprockets in order to achieve the equivalent power transmission results as a single extended width chain.

Engine timing systems conventionally include at least one driving sprocket located on the crankshaft and at least one driven sprocket located on the camshaft. Rotation of the crankshaft causes rotation of the camshaft through the chain and sprocket system.

The most basic conventional engine timing system typically includes a single sprocket on the crankshaft connected to a single sprocket on the camshaft, with the crankshaft sprocket having one-half the number of teeth of the camshaft sprocket. Such a camshaft typically controls the valve train operation through hydraulic lifters and rocker arms connected to the valve stems. The chain can be of a narrow width in construction, such as shown in U.S. Pat. No. 4,758,210, which is incorporated herein by reference.

A more complicated engine timing system of the prior art connects the crankshaft with two overhead camshafts by a pair of chains. The crankshaft includes two sprockets. Each chain is connected to a single sprocket on each of the two overhead camshafts. Typically, the chain systems will include tensioners on the slack side of each chain to maintain chain tension and snubbers on the tight side of each chain to control chain movement during operation.

More complicated engine timing systems are also utilized in the prior art. Such systems include timing systems having two (or dual) overhead camshafts for each bank of cylinders. The dual camshafts on a single bank can both be rotated by connection to the same chain. Alternatively, the second camshaft can be rotated by an additional camshaft-to-camshaft chain drive. The cam-to-cam drive chain can also include single or dual tensioners for chain control. All of these structures are known in various forms in the prior art.

Conventional timing systems of the prior art can also include more complicated structures than a single sprocket on the crankshaft driving a single sprocket on a camshaft. Some systems include an idler sprocket between the crankshaft and camshaft. One chain system drives the idler which in turn drives either single or dual overhead camshafts. The sizing of the idler gear is such as to allow different rotational speeds of the crankshaft and camshaft. For example, the crankshaft may rotate twice the speed of the crankshaft by the sizing of the sprockets for the chain and sprocket drive system.

Noise is associated with chain drives. Noise is generated by a variety of sources, but in silent chain drives it can be caused, in part, by the impact sound generated by the collision of the chain and the sprocket at the onset of meshing. The loudness of the impact sound is affected by, among other things, the impact velocity between the chain and the sprocket and the mass of chain links contacting the sprocket at a particular moment or time increment.

The meshing impact sound is generally a periodic sound in chain drives. The impact sound is repeated with a frequency generally equal to that of the frequency of the chain meshing with the sprocket. The frequency is related to the number of teeth on the sprocket and the speed of the sprocket. The impact can produce sound having objectionable pure sonic tones.

Another cause of noise in chain drives is the chordal action of the chain and sprockets as the chain is driven about the sprockets. Chordal action occurs as the chain link enters the sprocket from the free chain. The meshing of the chain and sprocket at the chain mesh frequency can cause a movement of the free chain or span (the part of the chain between the sprockets) in a direction perpendicular to the chain travel but in the same plane as the chain and sprockets. This vibratory movement can also produce an objectionable pure sonic tone at the frequency of the chain mesh frequency or a derivative of it.

Many efforts have been made to decrease the noise level and pitch frequency distribution in chain drives of the silent chain variety to minimize the objectionable effects of the pure sonic tones. The problem of noise reduction in silent chain drives was addressed in U.S. Pat. No. 4,342,560 by changing the contacts between the link flanks of a silent chain and the sprocket teeth by having differently configured link flanks in different sets of the chain. By mixing links of differing flank configuration, U.S. Pat. No. 4,342,560 attempted to modify the pattern of sound emanating from the chain contacting the sprocket by altering the types of link configurations and thus altering the point and rhythm of contacts. A similar concept was used in U.S. Pat. No. 4,832,668. Each of these patents teaches the reduction of chain noise level by randomization of elements within the chain, such as link configuration or profile, or link aperture-to-flank spacing distance.

U.S. Pat. No. 4,915,675, which is incorporated herein by reference, utilized the same concept of modifying the pattern of sound emanating from the chain by altering the types of link configurations. That patent teaches the utilization of an asymmetrically shaped link form which is then oriented in two different directions in the chain assembly to alter the point and rhythm of chain to sprocket contacts.

Other attempts to alter the rhythm of contacts between the silent chain drive and the sprocket have focused on the modification of elements within the sprocket, such as the sprocket tooth profile or the spacing of the sprocket teeth on the sprockets. For example, U.S. Pat. Nos. 3,377,875 and 3,495,468, which are both incorporated herein by reference, teach modification of certain sprocket teeth or even elimination of some teeth in order to achieve noise reduction in contacts between the links of the silent chain and the sprocket teeth.

The present invention is directed to noise reduction by modification of the impact sound pattern and the chordal action sound pattern, which are generated by chain and sprocket contacts. The invention attempts to modify those sound patterns by various phasing relationships between the chain assembly and the sprockets. Phasing the chain and sprocket relationship can reduce the number of chain link teeth (or mass of chain) impacting the sprocket during a given time increment. Similarly, phasing the chain and sprocket relationship can alter or phase the chordal action or articulation of the chain and sprocket. Both of these phasing modifications, alone and in conjunction with the randomization of the chain and sprocket contacts, can alter the impact and chordal action generated sound patterns.

With regard to use of phasing relationships in the prior art, a manual transmission drive of the Saab 99 vehicle used three individual roller chains in parallel on three separate, spaced-apart sprockets. These roller chains differ from the inverted tooth chains of the present invention and have different power transmission and noise characteristics. The three identical roller chains were run in parallel with each chain and sprocket phased by ⅓ pitch relative to the adjacent chain and sprocket. This system is described in an August 1980 ASME paper entitled "Roller Chain as a Transfer Drive for the Automobile." A roller chain system with offset sprockets is also shown in U.S. Pat. No. 3,029,654.

Japanese published patent applications nos. 62-56141, 63-227318, 63-75516 and 1-51359 each describe phased or offset sprockets for use in transmission or in a transfer case for a four-wheel drive vehicle. These publications do not disclose engine timing systems. Moreover, these prior art applications differ from the transmission and transfer case applications of the present invention in which phasing is utilized in conjunction with random or hybrid chains. The published Japanese applications teach the use of a "cancellation effect," which is developed by the particular spacing of two offset sprockets. The "cancellation effect" differs from randomization in its approach to the problem of chain noise. Cancellation relies on a pair of sprockets offset by ½ pitch in conjunction with two non-random chains. Each sprocket provides a repetitive pattern of discrete chain and sprocket contacts which are phased by ½ pitch and therefore act to "cancel" one another. In contrast, the random chain in the transmission embodiment of the present invention provides a random pattern of contacts between chain and sprocket. Randomization is inconsistent with the concept of cancellation through generation of a repetitive pattern of discrete contacts.

The Japanese prior art applications do not utilize phasing in conjunction with an engine timing system. Timing systems applications include load fluctuations and extreme center distances that differ dramatically from transfer case applications.

One embodiment of the present invention seeks to provide a phasing relationship by using a silent chain construction having randomization achieved by use of a combination of single toe inverted tooth links with conventional two toed inverted tooth links in a single chain assembly or in a double chain assembly. The combination of single toe links and two toed links can randomize or alter the pattern of link and sprocket tooth contacts in the chain and sprocket assembly. The single toe links are provided in a chain assembly with a split sprocket having a phased relationship, or a non-phased relationship.

Prior art chains have utilized single toe links, but not in a dual chain or phased chain assembly relationship. For example, U.S. Pat. No. 959,046 discloses a single toe guide link. However, the guide links act only to maintain the chain assembly on the sprockets. The guide links do not provide direct power transfer to or from the sprocket and thus do not impact the sprocket at the chain mesh frequency. Hence, the use of single toe guide links does not effect the noise spectrum produced by the sprocket tooth contacting links or articulating links.

U.S. Pat. No. 579,742 discloses a chain with single toe links that are located slightly off-center. The links engage the sprocket through antifriction balls that are trapped in sprocket cavities. All of the links of the chain have single toes.

U.S. Pat. No. 637,056 shows a chain with single toe links that are substantially centrally located. The patent discloses a chain having cylindrical sprocket teeth that come into contact with the link toe at its base. The contact of the link and the cylindrical toe is intended to occur on both sides of the toe. All of the links of the chain are single toe.

As part of the phased chain and sprocket assembly, the present invention also provides a modified sprocket construction. The modified sprocket may be used with the random or hybrid chain assemblies, or with the single toe link chain assembly, to provide the phased chain and sprocket relationship. The single toe links and sprocket are utilized in an attempt to modify the pattern of contacts between the chain and the sprocket and minimize problems of interference of the links with the sprocket as the links move off of the sprocket teeth.

SUMMARY OF THE INVENTION

The subject matter of this application relates specifically to bank-to-bank phasing of overhead cam timing chains. The invention has application to phased chain systems where the chains are in a non-parallel relationship and applies to phasing of the initial contacts of the chains with the sprockets.

The present invention relates to phased chain assemblies or systems. That is, transmission, transfer case or engine timing systems in which the sprockets are split into two portions or separate assemblies and the portions are offset or phased with respect to one another, with single or multiple chains.

The present invention is directed to providing a phased relationship between a pair of chain assemblies and a pair of sprockets in a chain system. The phasing is provided to modify the impact generated noise spectrum as well as the chordal action generated noise spectrum. The phasing of the present invention involves modifications to the chain construction, the sprocket construction, and the relationship between the positioning of the chain assemblies and sprockets.

Phasing the chain and sprocket relationship can reduce the number of chain link teeth (or mass) impacting the sprocket during a given time increment. Similarly, phasing the chain and sprocket relationship can alter or phase the chordal action or articulation of the chain and sprocket. The chain randomization and sprocket phasing modifications can alter the impact and chordal action generated sound patterns.

The phasing of the present invention is achieved by modifications to the chain assemblies as well as modification to the sprockets. The modifications to the sprockets include the use of split sprockets which are phased by one-half tooth, or one-half pitch. The modifications to the chain assemblies include randomization or the use of single toe links in a single assembly or dual chain assemblies.

In one embodiment of the present invention, the sprockets of an engine timing system are split into two portions and the portions are offset or phased with respect to one another. The engine timing system includes one driving sprocket located on the crankshaft and one driven sprocket located on the camshaft. Rotation of the crankshaft causes rotation of the camshaft through the chain and sprocket system. The crankshaft sprocket has one-half the number of teeth of the camshaft sprocket. The crankshaft sprocket and camshaft sprocket are each split and offset by one-half pitch. Two side-by-side chains are placed on the sprockets in the phased relationship. One or both chains may be a random chain, as described below.

In another embodiment of the present invention, the engine timing system connects the crankshaft with two overhead camshafts by a pair of chains. The crankshaft includes two sprockets, which are phased. Each chain is connected to a single sprocket on each of the two overhead camshafts. Alternatively, each of the sprockets on the overhead camshafts is split and phased, which requires four sprockets on the crankshaft. Two of the four sprockets can be phased by one-half pitch from the other two sprockets, or all four sprockets can be phased by one-quarter pitch. The chain systems will include tensioners on the slack side of each chain to maintain chain tension and snubbers on the tight side of each chain to control chain movement during operation.

In another embodiment of the present invention, a timing systems has two (or dual) overhead camshafts for each bank of cylinders. The dual camshafts on a single bank can both be rotated by connection to the same chain. Alternatively, the second camshaft can be rotated by an additional camshaft-to-camshaft chain drive. The cam-to-cam drive chain can also include single or dual tensioners for chain control. Each sprocket in the system is split into two sprockets, which are phased or offset.

In the various embodiments of the present invention, each single sprocket is replaced by a pair of sprockets that are phased by one-half pitch. Alternatively, the single sprocket can be replaced by three sprockets that are phased by one-third pitch, and then utilized with three chains. Other modifications of number of sprockets and degrees of phasing are possible and within the scope of the present invention.

In some embodiments of this invention, which specifically relate to transmissions or transfer cases, one or two random (or hybrid) chains are provided with the split sprocket having one side phased one-half tooth ahead of the adjacent side. The random, or hybrid, chain includes link sets of two different configurations, or links of a first set being different from links of a second set. The links of the two link sets may differ in contour, flank configuration, leading inside flank configuration, outside flank configuration, orientation (as with asymmetrical links), type of driving contact with the sprocket teeth or other types of randomization. The term contour refers to the overall shape or outline of the perimeter of the link.

Such an embodiment phases the impact noise spectrum by randomization and having effectively one-half of the teeth impacting the sprocket tooth during a given time increment, in comparison to a single chain of the extended width of the two chain assemblies. This embodiment also phases the chordal action of the chain by having the pins of the two chains offset by one-half pitch. The randomization enhances the effect of the sprocket phasing on the impact and chordal action generated noise spectra.

In another embodiment of this invention, one or two random or hybrid chains are provided with a split sprocket having one side phased one-half tooth ahead of the other side, and the sprocket teeth being randomized. The randomization of the sprocket teeth may be in any manner, such as variable spacing, relieved teeth or tooth elimination.

Each of these embodiments, as well as certain other embodiments, may include a plurality of chain assemblies, including assemblies of two, three, or four chain strands. Additionally, the sprockets may be phased ¼, ⅓ or ½ tooth, as well as various other amounts of pitch. Moreover, the dual chain assemblies may be spaced along the shaft, and not necessarily part of a split sprocket. In such a configuration, care must be taken to assure that the sprockets are tightly splined with respect to the shaft to allow phasing of the chordal action.

Further, modifications may also be made to the chain assemblies. In one embodiment of the present invention, randomization is achieved by providing two chain assemblies of differing pitch. In another embodiment of this invention, randomization of the chain assembly is achieved by a combination of links having a pair of depending toes and links having a single depending toe. In another embodiment, the chain assembly includes a lacing having fewer links in the guide link rows than in the non-guide link rows.

In another embodiment of the present invention, an effort is made to match the load on the two chains in the phased system. As the difference in center distances between the two chains approaches zero, the load carried by each chain approaches an equal value. By matching the center distances, the load is more equally shared and each chain wears at approximately the same rate.

In each chain assembly, the links are interleaved to form sets of links. Each link includes a pair of apertures, with an aperture from one set of links being aligned for interlacing with an aperture from an adjacent set of links. Pivot means, in the form of round pins or rocker joints, are utilized to connect the adjacent sets of links through the apertures, and to allow pivoting of the sets of links with adjacent sets. Guide links are placed on alternating sets to maintain the alignment of the chain on the sprockets.

The chain assembly of the embodiment having single toe and two toe links utilizes the two different links in link sets or ranks extending across the width of the chain. The links are arranged in patterns by sets in order to modify the pattern of contacts of the links with the sprocket teeth. Thus, set by set or in a single set of the single toe links chain assembly, one or more two toed links may be followed in series by one or more single toe links, which are followed by one or more two toed links to complete the set across the width of the chain.

In the columns of links extending along the longitudinal length of the chain assembly, some columns consist solely of links with two depending toes and other columns consist solely of links with a single toe. In one embodiment, the two toed links and single toe links are placed in columns in the chain and a particular column of links running down the length of the chain will include either two toe links or single toe links. In one specific embodiment, a plurality of columns of two toed links are formed on the outside of the width of the chain with the single toe links being in a column or plurality of columns on the inside of the width of the chain. The single toe links in the center act as an inside guide link to maintain the chain along the sprockets. Thus, the use of flanking guide links on the outer edge of the chain may be eliminated in some embodiments. The toes of the single toe links may be located symmetrically with the center of the link or may be located slightly offset or asymmetrical with the center of the link.

In another embodiment of the present invention, a chain and sprocket assembly includes a split sprocket and two chains in side-by-side relationship on the sprocket. One chain of the chain assembly is assembled with single toe links. The second chain of the assembly is assembled with conventional two toed links.

In this embodiment, the sprocket is split and constructed to accommodate the first chain, or chain assembly portion, with single toe links on one side and the second chain, or chain assembly portion, with two toed links on the other side, and the sprocket teeth of one side are phased approximately one half space ahead of the other side. In such a chain assembly, the point of articulation of one chain is approximately one half space ahead of the other chain. Alternatively, the sprocket portions are not phased but the teeth are aligned.

This embodiment may be combined into a single chain assembly, as in the earlier described embodiments. In such a composite chain assembly, the single toe links are on one side along the length of the chain and the two toed links are on the other side along the length of the chain. The composite chain assembly would be utilized with the split sprocket.

Use of silent chain assemblies and sprockets constructed in accordance with the teachings of the present invention is expected to result in the generation of noise patterns that are modified in comparison with the noise patterns generated by a chain and sprocket assembly that does not utilize phased chain and sprocket relationships. The chain assembly of this invention is suitable for use in a variety of types of chain assemblies and with a variety of sprocket tooth forms.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 1 is a side elevational view of a portion of the chain assembly of one embodiment of the present invention, illustrating two types of links interconnected by a round pivot means;

FIG. 2 is a top plan view of a portion of the chain of FIG. 1;

FIG. 3 is a perspective view of a portion of a sprocket for use with chain assemblies of the present invention;

FIG. 4 is a perspective view of an alternate embodiment sprocket for use with chain assemblies of the present invention;

FIG. 5 is a sectional view of the chain assembly taken along the line 5—5 of FIG. 2;

FIG. 6 is a sectional view of the chain assembly taken along the line 6—6 of FIG. 2;

FIG. 7 is an exploded view of a portion of the chain assembly showing one pattern of assembly of the links of the chain;

FIG. 8 is a side elevational view of a two toed link of the chain;

FIG. 9 is a side elevational view of a single toe link of the present invention;

FIG. 10 is a side elevational view of an alternate embodiment of a single toe link of the present invention, having the tooth slightly offset from the vertical centerline of the link;

FIG. 11 is a side elevational view of a chain assembly of two toed inks for use in conjunction with an assembly of single toe links; and, FIG. 12 is a side elevational view of a chain assembly of single toe links for use in conjunction with the assembly of two toed links of FIG. 11.

FIG. 13A is a side elevational view of the single toe link of one embodiment of the present invention;

FIG. 13B is a side elevational view of the two toe link of one embodiment of the present invention;

FIG. 14 is a side view of one embodiment of the chain of the present invention having single toe links and two toe links;

FIG. 15 is a sectional view of the chain taken along line A—A of FIG. 14;

FIG. 16 is a side view illustrating the chain and sprocket contacts of the chain of FIG. 14;

FIG. 21A is a side view of a section of links having single toes;

FIG. 21B is a side view of a link having a single toe;

FIG. 22A is a side view of a section of links having double toes;

FIG. 22B is side view of a link having two toes;

FIG. 23 is a side view of a sprocket for the chain assembly of the links of FIGS. 21 and 22, showing the sprocket for the links of FIG. 21 in phantom, with the teeth aligned.

FIG. 29 is a schematic illustrating a timing chain system with single overhead camshafts;

FIG. 34 is a schematic illustrating the positioning of the two camshafts and a single crankshaft and four chains;

DETAILED DESCRIPTION OF THE PREFERRED EMBODIMENTS PHASED CHAIN ASSEMBLIES

Turning now to the drawings, the present invention is directed to providing phasing of chain assemblies and associated sprockets. The phasing is provided to modify the impact generated noise spectrum as well as the chordal action generated noise spectrum.

Figure 26A:
FIG. 26A is a side view of a link having straight inside flanks.
Figure 26B:
FIG. 26B is a side view of a link having curved inside flanks.
Figure 27A:
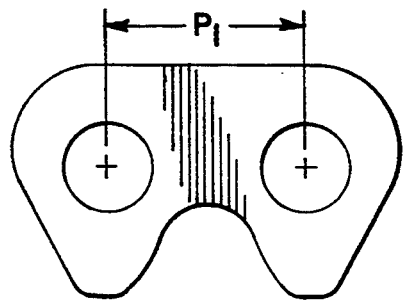
FIG. 27A is a side view of a link having a first pitch length.
Figure 27B:
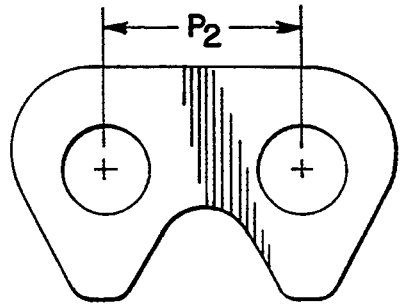
FIG. 27B is a side view of link having a second pitch length.

The present invention modifies the impact sound spectrum by modifying the pattern of impacts of the chain link teeth with the sprocket teeth. In a conventional chain assembly, where the links of a particular set or row of links are of identical configuration or identical pitch, the flanks of the teeth of the links in the row all contact the sprocket teeth at approximately the same instant. In a random or hybrid chain assembly, the links sets include links of different configuration, contours, orientations or pitch. Examples of links from random chains are shown in FIGS. 26A and 26B, where the inside flanks of the two links differ in configuration, and in FIGS. 27A and 27B, where the pitch P1 of one link differs from the pitch length P2 of the other link. The inside flanks of the link in FIG. 26A are substantially straight while the inside flanks of the link in FIG. 26B are curved. In a random chain the flanks of the teeth of the links in the same row all contact the teeth of the sprocket at approximately the same time or instant, but the pattern of link and sprocket teeth contacts is modified as between the sets. By phasing, or modifying, the timing or mass of chain links contacting the sprocket during a particular instant or time increment, the impact sound generated by the chain and sprocket contacts may be further lessened and the pure sonic tones generated by the contacts may also be lessened or avoided.

The present invention provides impact phasing in a number of different ways. In a number of the described embodiments, the chain assembly is divided into several portions and the sprockets for each portion are phased or adjusted by one-fourth, one-third or one-half tooth space with respect to the adjacent portion of the chain assembly. In this manner, the mass of links contacting the sprocket during the given time increment is lessened and the repetition of contacts is further modified.

The present invention also phases or modifies the chordal action of the chain and sprocket in order to modify the sound pattern or spectrum generated by the chordal action. Chordal action occurs as the chain link enters the sprocket from the free span of the chain. The link is pivoted with respect to the free span as the link contacts the sprocket tooth and begins to enter and seat in the sprocket. Chordal action generates movement of the chain in a direction perpendicular to the linear movement of the chain and generates an objectional pure sonic tone. Chordal action causes a speed variation in the linear movement of the chain, which results in a tension variation on the sprockets.

Figure 25:
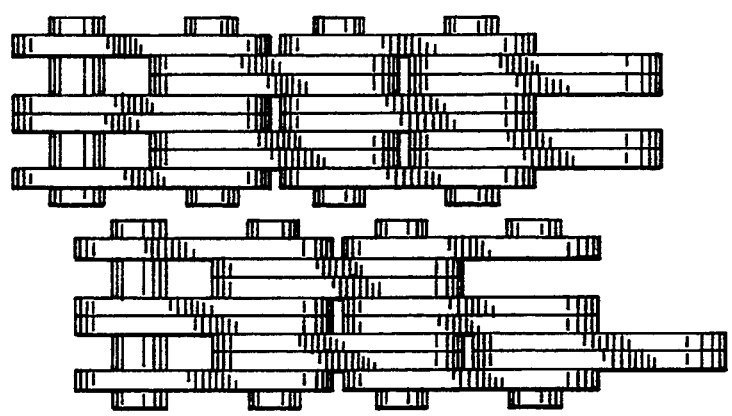
FIG. 25 is a top view of a pair of chains of offset by one half pitch.

The present invention provides chordal action phasing in a number of ways. In the embodiments where the random chain assembly is divided into several portions and the sprockets placed in phased relation between those portions, the chordal action of the chain is phased by the location of the pins in each portion of the chain assembly. By having the pins offset in adjacent portions of the chain, which a result of the phasing of the sprocket teeth, the chordal action of the chains entering the sprocket teeth is phased with respect to adjacent portions of the chain assembly. FIG. 25 illustrates the two separate chain assemblies where the pins of the two chain assemblies are offset by one half pitch.

In some embodiments of the present invention, only the impacts between the chain links and the sprocket are phased. In other embodiments, only the chordal action between the chain assemblies and the sprockets is phased. In some embodiments, both the impacts and the chordal action are phased.

FIG. 1 illustrates a portion of one embodiment of the chain assembly of the present invention generally at 10. The chain assembly may be of a hybrid or random type in which links are provided in two different type of link sets, such as shown in U.S. Pat. No. 4,342,560, which is incorporated herein by reference. Examples of links from random chains are shown in FIGS. 26A, 26B, 27A and 27B. The chain shown specifically in FIG. 1 is a species of the present invention which includes link sets having links with two inverted teeth and links with a single inverted toe, which is described in more detail below.

The chain assembly includes sets 12, 14 or ranks of links, which are shown more clearly in FIG. 2. A single set or row of links extends across the width of the chain and includes several interleaved links. The sets are then interleaved with adjacent sets to form the endless chain assembly.

The chain assembly is utilized to drive, for example, an engine timing assembly including a camshaft (not shown) and crankshaft (not shown), or a transfer case for four-wheel drive vehicles. On the shafts are mounted sprockets, such as the sprockets 18, 19 shown in FIGS. 3 and 4. The sprockets provide the means of power transfer between the chain and the two shafts. The sprocket 19 of FIG. 4 is split into two portions 86, 88, which are phased or off-set by one-half tooth space. The sprocket 18 of FIG. 3 is split into three portions 70, 72, 74 which are off-set by one-half tooth space. Alternatively, the portions of sprocket 18 may be off-set by one-third tooth space for each section of the sprocket.

Figure 24:
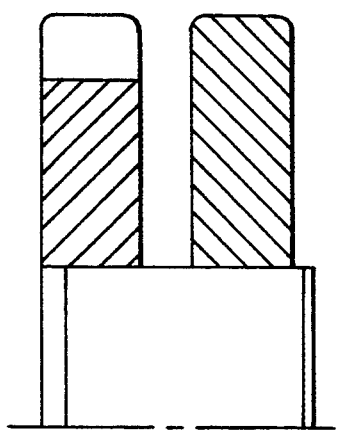
FIG. 24 is a sectional view of a pair of sprockets in spaced apart position on a shaft.

The sprocket portions may be located adjacent to each other, and formed of a single piece or fused together. Alternatively, the sprocket portions may be separated and spaced apart across the length of the shaft. However, care must be taken when the sprockets are spaced apart that the sprockets are splined tightly to the shaft. Any excess tolerance between the sprocket and the spline will defeat the chordal action phasing of the assembly. FIG. 24 illustrates portions of each of two sprockets that are splined to a shaft. The sprockets are shown in separate and spaced apart relation.

In one embodiment of the present invention, a pair of hybrid or random chain assemblies, that is, a chain assembly having link sets with links of differing contour, configuration, orientation or pitch, are utilized with the phased sprocket portions 86, 88 of FIG. 4. By phasing the sprocket portions one-half tooth space, both the impact and the chordal noise spectra are phased. The randomization of the links of the chain will further modify the impact and chordal action sound spectra, which is expected to result in chain of lower noise than a conventional chain and sprocket assembly. In a second embodiment, three random chain assemblies are utilized with the phased sprocket portions shown in FIG. 3 or with three sprocket portions that are phased one-third tooth space. Additional similar embodiments are possible where additional random chains are utilized with additional sprocket portions, and the phasing relationship of the sprocket portions is altered to differing tooth space relationships.

In another embodiment of the present invention, the above-described random chain is utilized with random or hybrid sprockets as the phased sprockets. The hybrid sprocket utilizes unevenly spaced teeth. The spacing of the teeth is modified by relieving certain portions of certain teeth, or by changing the configuration of the flanks of the sprocket teeth. The hybrid sprocket may be used with a standard sprocket or in pairs of hybrid sprockets in combination with any of the above-described embodiments.

In another embodiment of the present invention, randomization is achieved by using the sprockets of FIGS. 3 and 4 are with two chains of different pitches. For example, a $\frac{3}{8}$ inch pitch chain may be used with sprocket portion 86 of FIG. 4 and a $\frac{1}{2}$ inch pitch chain may be used with the sprocket portion 88 of FIG. 4. The use of chains of differing pitch further randomizes or modifies the pattern of contacts between the chain and sprocket and thus modifies the impact and chordal action generated sound spectra. The sprockets are phased by the use of differing number of teeth on the sprockets to match the chains of differing pitch.

In another embodiment of the present invention, the center distances of the two chains of the phased chain system are matched as closely as possible. The matching of center distances can be utilized in any of the other embodiments described in this application. The center distances are matched in an effort to match the loading of the two chains in the phased system.

As the two chains in the system are operated, the chain which carries the higher load will tend to wear at a faster rate than the chain with the lower load. The greatest variation in sharing of load occurs at the lowest torque applications of the system. Moreover, the chain with the shortest center distance tends to transmit the greatest load, or carry a disproportionate share of the load.

In the present invention, the center distances of each chain are matched as closely as possible in an attempt to equalize the wear rates of the two chains. As the difference in the center distances of the two chains approaches zero, the load is more equally shared between the chains and the wear rates match more closely.

While the sprockets of the two chain assemblies may each be fixed on parallel shafts, the center distance of each chain assembly depends on the chain length, pitch, sprocket size, and manufacturing tolerances. If the chain length, pitch and number of teeth on each sprocket are known, then the center distance may be determined from standardized tables known in the art. The number of teeth on the sprockets may vary as, for example, when driving between a large and a small sprocket. The present invention attempts to match the center distances of the two or more chains in the phased system as closely as possible within manufacturing tolerances.

In operation, the chain assembly of the present invention modifies the pattern of contacts of the chain with the sprocket. The impacts of the links with the sprocket are modified by use of the random chain with the phased sprockets in the chain assembly. Additionally, the chordal action of the sprockets will be altered and reduced on account of the modification of the chain mesh with the sprocket. Modification of the chain and sprocket assembly in the described manners will result in a modification of the pattern of contacts which will modify the noise spectrum for the chain.

Use of a chain assembly or a sprocket constructed in accordance with the teachings of this invention is expected to result in the generation of a noise pattern that is modified in comparison with the noise pattern generated by a chain and sprocket in which all of the links are of identical configuration and no phasing relationship is present between the sprockets of the assembly. The chain assembly of this invention is suitable for use with a variety of chain types and sprocket tooth forms. Of course, some patterns of combinations of chain assemblies and sprocket phasing relationships will provide less objectionable noise characteristics than other combinations.

HYBRID CHAIN ASSEMBLY WITH SINGLE TOE LINKS

In another series of embodiments of the present invention, the phasing is accomplished by the combination of single toe and two toed links in the chain assembly. The combination may be included in a single assembly or by having the two portions of the assembly in conjunction with the split sprockets shown in FIGS. 3 and 4. The species of the invention shown in FIG. 1 includes the single toe links and two toed links in sets 12 and 14.

Some sets of links, those designated as set 12, may also include flanking guide links 20 along their outside edge. The guide links 20 are included in every other set of links and act to maintain the chain assembly on the sprockets. The guide links do not include any depending members or teeth for contacting the sprockets. An inside guide link may also be used, in which case a groove is provided in the sprocket to maintain the position of the guide link. With certain embodiments of the invention, as shown below, the center links act as center or inside guide links, and thus outside flanking guide links are not necessary to maintain the alignment of the chain on the sprockets.

The sets 12, 14 of links also include interleaved driving links 22, 24 or inverted tooth links. The inverted tooth links are provided in a number of forms or configurations, as shown in FIGS. 7, 8, 9, and 10. The two toed links 22, shown in FIG. 8, are known in the prior art, and are utilized in the previously described random chain embodiments. The links 22 have a pair of apertures 28, 29 and a pair of depending toes 30, 32. The toes are defined by outside flanks 34, 36 and inside flanks 38, 40. The inside flanks are joined at the crotch 41. The inside and outside flanks of link 22 can have a number of configurations, including straight or arcuate. The link can be symmetrical about a vertical centerline between the apertures 28, 29 or can be asymmetrical about the centerline.

The single toe links of the present invention include the links 24 and 26, shown in FIGS. 9 and 10. The link 24, shown in FIG. 9, has a pair of apertures 42, 44, but only a single depending toe 46. The toe 46 has two flanks 48, 49, of which one or both can be designed for contact with the sprocket teeth. Alternatively, the single toe can be designed for contact with the root of the sprocket and therefore to avoid contact with the sprocket teeth. The flanks can be any number of configurations, including straight or arcuate, and can be designed to contact or to avoid contact with the sprocket teeth.

The link has a pitch 50 measured between the centers of the apertures 42, 44. The tooth height 52 is measured from the horizontal centerline to the base of the toe 46. The tooth is constructed to minimize interference with the sprocket teeth as the tooth is coming off of the sprocket. The tooth geometry is calculated on the basis of number of teeth, pitch, tip radius, flank contact radius, toe height and tooth angle, and the acceptable amount of interference.

The single toe link 26, shown in FIG. 10, has a pair of apertures 56, 58, and a single depending toe 60. The toe is located asymmetrically or slightly offset with respect to the vertical link centerline between the apertures. The toe includes two flanks 62, 64 for contact with the sprocket. As in the other link embodiments, the flanks can be any number of configurations, including straight or arcuate, and can be designed for contact with or to avoid contact with the sprocket teeth.

The sets of interleaved links 22, 24, 26 are shown in FIGS. 1, 2 and 7. The sets may include mixtures of links 22 and 24, or links 22 and 26, or mixtures of all three types of links and additional links. As shown in FIG. 2, and detailed in the sectional views of FIGS. 5 and 6, a set of links across the width of the chain is formed of a number of two toothed links 22 and single toe links 24. As shown in FIG. 7, a column of links can include a number of interleaved two toed links 22, as in columns 67 and 68. An interleaved column 69 can include a number of interleaved single toe links 24.

In assembling the chain in the embodiment shown in FIG. 7, the columns 67, 68 of two toed links are formed by a conventional lacing of rows of links 22. Similarly, the column 69 of single toe links is formed by a conventional lacing of rows of single toe links 24. The columns 67, 68, 69 are then combined to form the chain assembly. In this manner, the single toe links 24 are placed between the two toed links 22. As a result of the combination in the assembly, the single toe links may act as an inside guide link, and the use of outside guide links 20 may be avoided in this embodiment.

In the embodiment shown in FIG. 7, the single toe links 24 are of the type shown in FIG. 9. That is, the single toe 46 is centrally located between the two apertures of the link. In a second embodiment, the single toe links are of the type shown in FIG. 10. That is, the single toe 60 is slightly offset from the vertical centerline of the link between the two apertures. In this second embodiment, the single toe link 26 may also act as an inside link which avoids the need for external guide links 20.

In the embodiment shown in FIG. 7, a column 67 of two toed links has a single link 22a interleaved with link 22b, which is interleaved with a single link 22c. Similarly, in column 68 on the opposite side of the chain, a single link 22d is interleaved with link 22e, which is interleaved with link 22f. In the center column of single toe links, a single link 24a is interleaved with two links 24b and 24c, which are interleaved with a single link 24d. The above-described lacing pattern continues along the entire length of the chain.

In another embodiment, certain of the links in FIG. 7 are altered in order to provide alternate lacing patterns. For example, either links 24b or 24c may be replaced in the lacing pattern with two toed links 24. Many other patterns and combinations of single toe and two toed links are possible that are within the scope of the present invention.

FIGS. 5 and 6 illustrate the expected contacts of the links of the chain FIG. 7 with the sprocket teeth as the chain enters the sprocket during operation. Some or all of the flanks of the two toed links and the flanks of the single toe links may contact the sprocket teeth. The exact contacts will be dependent on the configurations of the links and the arrangement of the links in the chain assembly. Alternatively, the single toe link can be designed to avoid contact with the sprocket teeth and only contact the root of the sprocket.

As shown in FIG. 3, the modified sprocket is also provided for use with the assembly of FIGS. 5, 6 and 7. As previously explained with regard to the other embodiments, the sprocket 18 is provided with three layers 70, 72, 74, with each layer having spaced sprocket teeth 76, 78, 80. The sprocket teeth are staggered in order to mesh with the combination of single toe and two toed links in the chain assembly of FIG. 7. The sprocket can be any number of layers in order to conform to the columns of two toed links or single toe links that are provided in the chain assembly, but is preferably of three layers with the center layer offset by one-half tooth space. The layers may be formed as a laminate and then combined together to provide the sprocket. In the combining of the three layers, the sprocket teeth of one layer can be staggered with respect to the teeth of another layer. Thus, each layer can be staggered by one-third pitch. The single toe links chain assembly of the present invention is capable of use with any number of configurations of sprockets, and is not limited to use with the sprocket of FIG. 3.

Another embodiment of the present invention is shown in FIGS. 11 and 12 in which a chain assembly comprises a combination of two chain assemblies in side-by-side relation. This embodiment combines the above-described embodiments of dual chain assemblies and phased sprockets with the embodiments of chains with single toe links. The first chain assembly 82 is preferably formed entirely of single toe links. The second chain assembly 84 is preferably formed entirely of conventional two toe links, such as links 22g, 22h, 22i, 22j. The chain assembly 82 of single toe links may include the links 24 of FIG. 9 with the toe centrally located, such as links 24e, 24f, 24g, 24h. Pins interconnect the links of the separate chain assemblies.

The split sprocket 19 is provided for use with the embodiment of two chain assemblies as shown in FIG. 4. The sprocket is constructed with the sprocket teeth of one side 86 indexed one half space ahead of the teeth on the other side 88 of the sprocket. In this manner, the point of articulation of one chain assembly is approximately one half space ahead of the other chain assembly.

Another embodiment of this invention is shown in FIGS. 13, 14, 15 and 16. This embodiment includes the chain assembly in two portions. The portions are either separated and spaced apart or combined into a single chain assembly. As shown, in FIG. 15, the chain can be a single assembly with pins 99 extending through the entire width of the chain. One portion of the chain assembly utilizes the single toe links 100, shown in FIG. 13A, which have a single toe 101 centrally located between the apertures 102, 104. The second portion of the chain assembly utilizes the conventional double toe links 106, illustrated in FIG. 13B. If the chain assembly is split into two portions, then the pins are aligned.

The chain assembly is shown in a side view in FIG. 14. As shown in FIG. 14, in this embodiment, the single toe 101 is longer than the toes 107 of the double toe link 106. The assembly is shown in sectional view in FIG. 15. The sectional view illustrated the central location of the single toe 101 and the locations of the two toes 107 of the double toe link 106.

The chain assembly is shown in relation to a sprocket 110 in FIG. 16. FIG. 16 illustrates the expected contacts of the chain with the sprocket teeth. As shown, the longer single toe 101 will seat deeper in the sprocket by positioning both flanks of toe 101 against the sprocket teeth.

Figure 17:
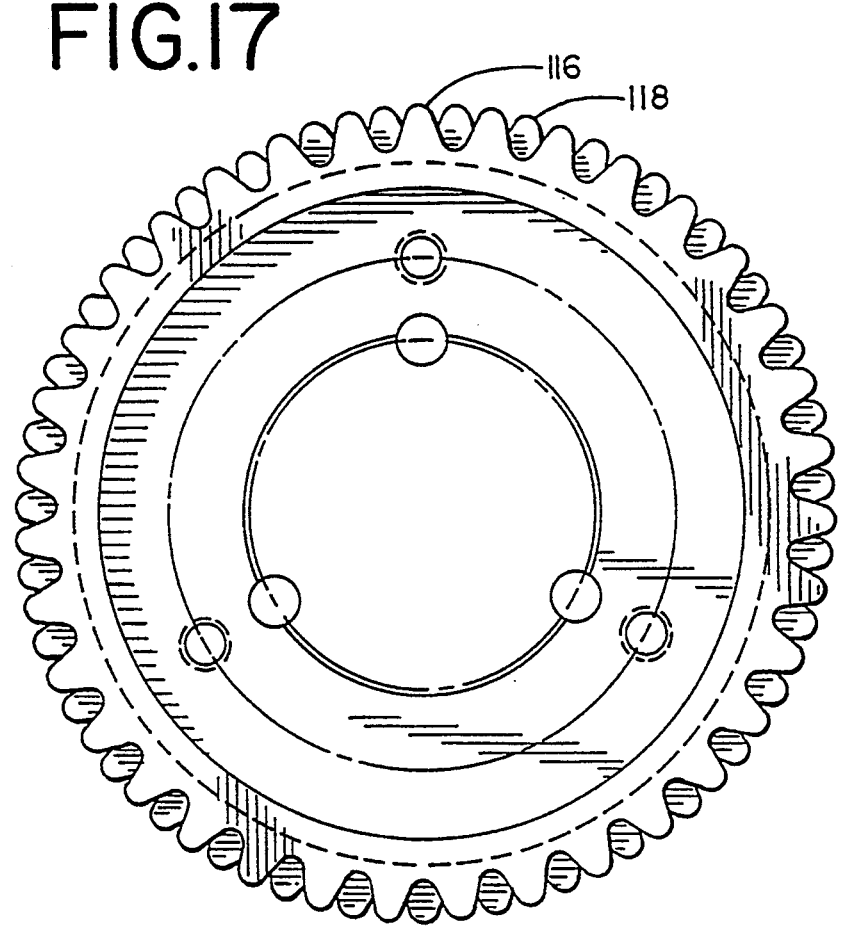
FIG. 17 is a side view of a dual sprocket assembly having the two portions phased by one-half pitch and the teeth offset.
Figure 18:
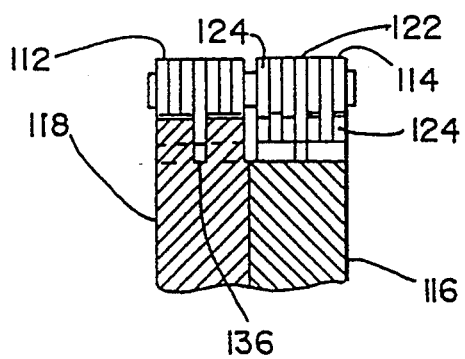
FIG. 18 is a sectional view illustrating the two portions of the chain assembly and the two portions of the sprocket assembly.

Another embodiment of the present invention having phased sprockets is shown in FIGS. 17, 18, 19, and 20. As shown in FIG. 18, the chain assembly is split with the first portion 112 and the second portion 114 phased by one-half pitch. The phasing is accomplished by offset of the two sprocket portions 116, 118 by one half tooth, as shown in FIG. 17. The chain assembly is constructed of three link types, that is, inner links 120, inner guide links 122 and outer guide links 124. The preferred embodiment of this construction utilizes a rocker joint, which includes an hour-glass shaped aperture 126 and a pair of pivot pins 128, 130. The aperture and pins are shown in U.S. Pat. No. 4,911,682, which is incorporated herein by reference.

Figure 19:
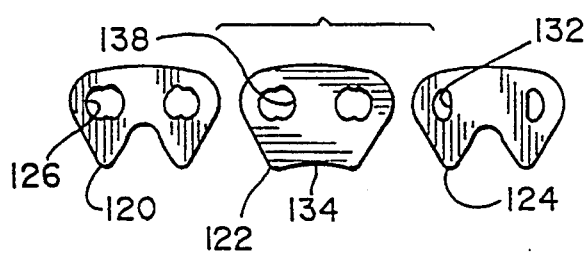
FIG. 19 is a side view illustrating the three types of links in the chain of FIG. 18.
Figure 20:
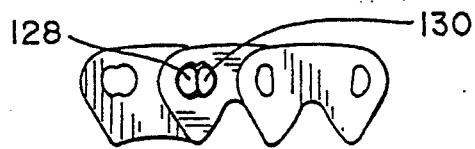
FIG. 20 is a side view illustrating the interleaving of the three links of FIG. 19.

The lacing pattern for the embodiment of FIG. 19, across the width of the chain, includes a single inner guide link 122 in the center and a pair of outer guide links 124 on each side. Between the inner guide link 122 and outer guide links 124 are a plurality of inner links 120. The inner links may be of identical configuration or may be randomized. The outer guide links 124 include a pair of depending toes which are constructed for contact with the sprocket teeth. The outer guide link includes an aperture 132 that provides a press fit with the pin 128. The outer guide links may be of identical configuration or may be randomized.

The inner guide link has a flat bottom 134 that does not include a crotch. The flat bottom is designed to ride in a groove 136 cut in the sprocket. The inner guide link maintains the chain assembly in its location on the sprocket. The inner guide link includes apertures 138 that allows articulation of the link with respect to the pins. The inner link 120 also includes an aperture 126 that allows articulation of the links with respect to the pins. The outer guide links have apertures that receive the pins in a press fit and thus do not allow articulation of the pins with respect to the links.

This construction of inner and outer guide links provides several advantages. For one, the inner guide link 122 lacks a crotch and thus is inherently stronger than the links having inverted teeth separated by a crotch. Second, the outer guide link, with the pins being press fit, is stronger than the links having apertures that allow articulation of the link with respect to the pins. The use of the stronger guide links allow fewer links in the guide rows in the lacing pattern to achieve the same strength chain. Fewer links in the guide rows allows a minimization of the number of links in the chain.

Additionally, the outer guide links 124 include inverted teeth that are constructed for contact with the sprocket teeth. The use of inverted teeth on the outer guide links allows more links to contact the sprocket than in similar chain having outer guide links that do not contact the sprocket. In this manner, for a given number of links in the chain, and width of chain, a greater number of links contact the sprocket. The embodiment shown in FIGS. 18, 19 and 20 may be used as a separate chain assembly, without the phased sprockets, and will achieve several of the advantages noted above.

Another embodiment of the present invention is shown in FIGS. 21, 22, and 23. The embodiment includes two chain assemblies, or a chain assembly having two separate portions. One portion of the assembly, shown in FIGS. 21A and 21B, utilizes single toe links 140. The other portion of the assembly, shown in FIGS. 22A and 22B, utilizes double toe links 142. The sprocket construction is a dual or split sprocket having one portion 144 constructed for receiving double toe links and another portion 146 constructed for receiving single toe links.

The sprocket portions have their teeth aligned. In the single toe link portion of the chain assembly, the pins 148 are centered over the teeth of the sprocket. In the double toe link portion of the chain assembly, the pins 150 are centered between the teeth of the sprocket. In this manner, the pins are offset and the chordal action of the two chain assembly portions is phased. However, the impact sound pattern of the two chain assembly portions is not phased, as the links impact the sprocket teeth in the two portions at substantially the same time.

In operation, the chain assembly of the present invention modifies the pattern of contacts of the chain with sprocket. The impacts of the links with the sprocket are modified by use of two toed and single toe links within the chain assembly. With different types of links with differing numbers of toes, the links will impact the sprocket teeth at varying time intervals. Additionally, the chordal action of the sprockets will be altered and reduced on account of the modification of the chain mesh with the sprocket. Modification of the chain in the described manner will result in a modification of the pattern of contacts which will modify the noise spectrum for the chain.

Use of a chain assembly or a sprocket constructed in accordance with the teachings of this invention is expected to result in the generation of a noise pattern that is modified in comparison with the noise pattern generated by a chain and sprocket in which all of the links are of identical configuration and have the identical number of toes. The chain assembly of this invention is suitable for use with a variety of sprocket tooth forms. Of course, some patterns of combinations of links will provide less objectionable noise characteristics than other patterns of links.

PHASED TIMING CHAIN SYSTEMS

Several embodiments of the present invention involve phased timing systems. In these embodiments, engine timing systems have single sprockets replaced by two or more sprockets or sprocket portions and the sprockets are offset or phased with respect to one another. These embodiments include a number of chain configurations, including chain lacing configurations especially useful for timing systems.

Figure 28A:
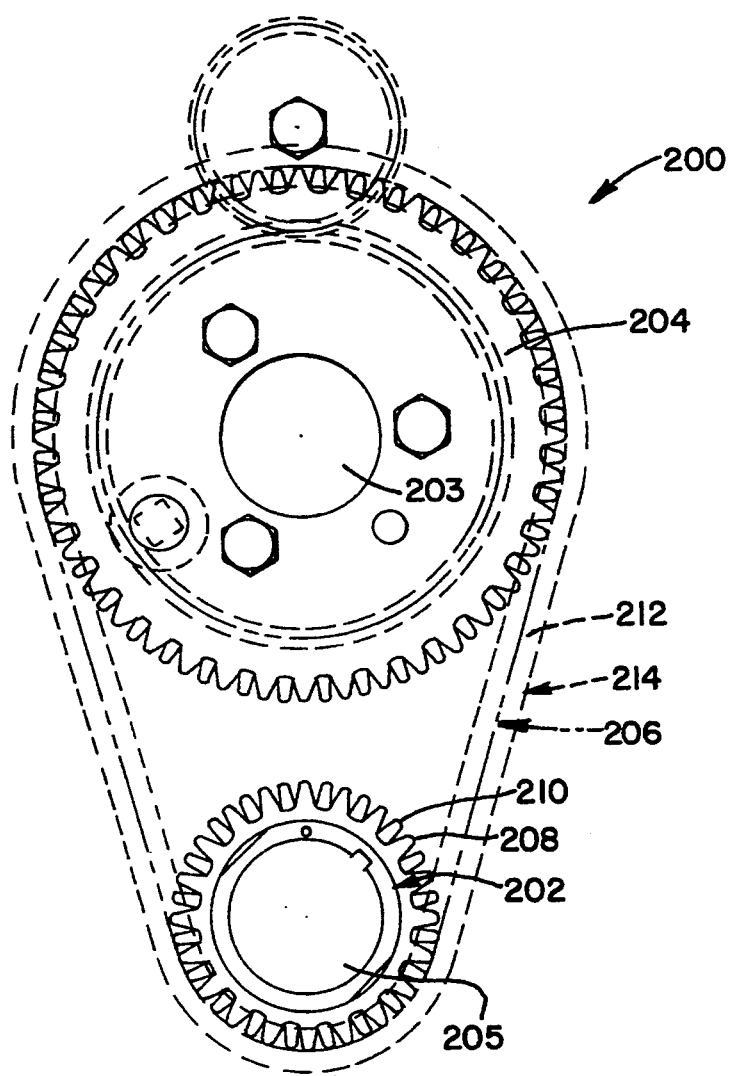
FIG. 28 is a schematic illustrating a timing chain system with a single camshaft and crankshaft.
Figure 28B:
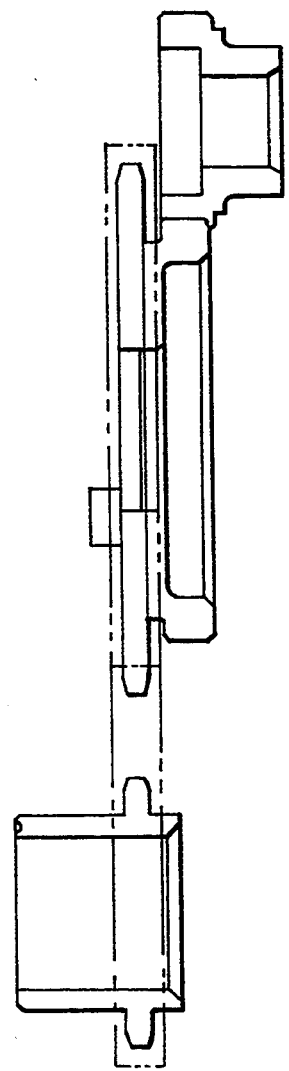
Figure 31:
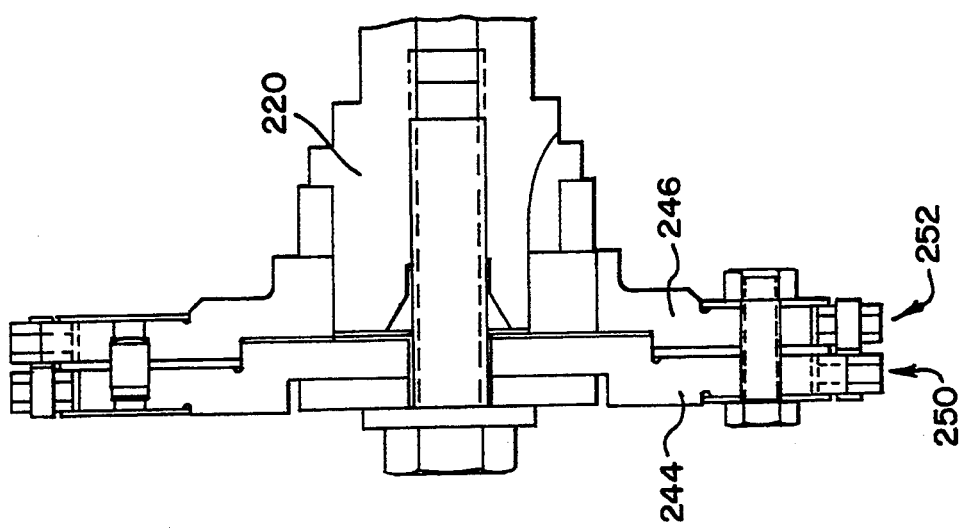
FIG. 31 is a sectional view along line A—A from FIG. 30A.
Figure 30B:
FIG. 30B is a top view of the chain system of FIG. 30A, illustrating the offset of the two chains.
Figure 30A:
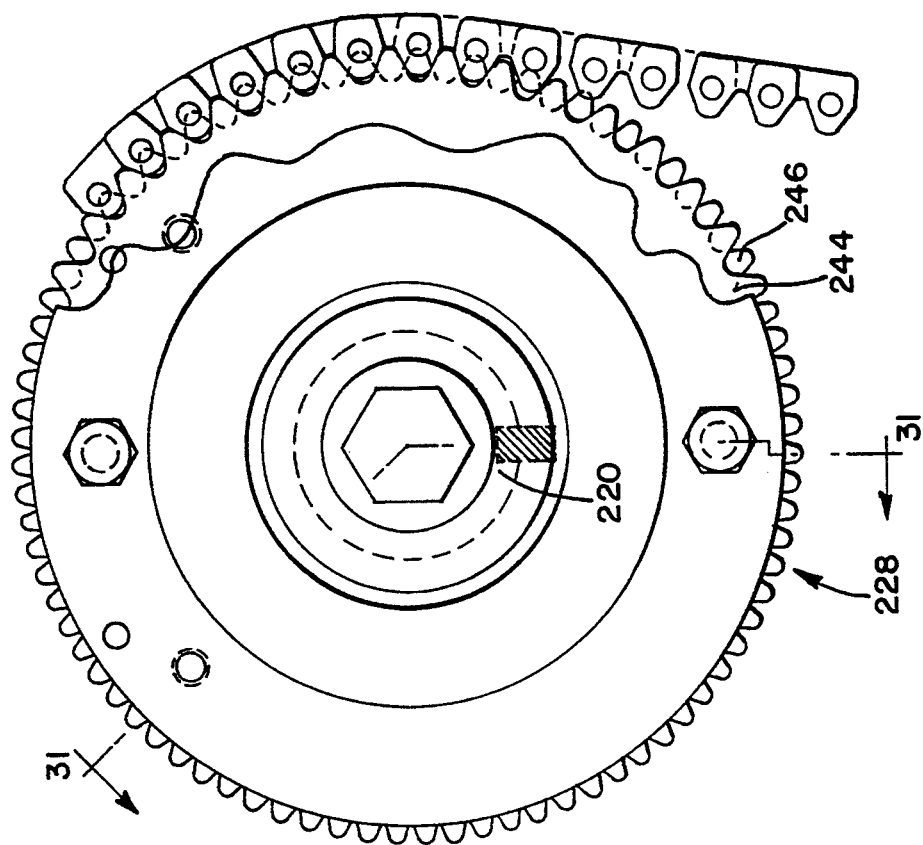
FIG. 30A is side view of a timing chain and camshaft sprocket.

FIGS. 28 and 29 illustrate two configurations of the phased timing system of the present invention. In FIG. 28, the engine timing system 200 includes one driving sprocket system 202 located on the crankshaft 203 and one driven sprocket system 204 located on the camshaft 205. Rotation of the crankshaft causes rotation of the camshaft through the chain 206 and sprocket system. The crankshaft sprocket 202 has one-half the number of teeth of the camshaft 204 sprocket. The camshaft typically controls the valve train operation through hydraulic lifters and rocker arms connected to the valve stems.

In order to implement the phasing of the present invention, the crankshaft sprocket and camshaft sprocket are each replaced by pairs of sprockets 208, 210 that are offset by one-half pitch. Two side-by-side chains 212, 214 are placed on the sprockets in the phased relationship. One or both chains may be a random chain.

In the embodiment illustrated in FIG. 29, the engine timing system utilizes a crankshaft 216 connected to two overhead camshafts 218, 220 by a pair of chain systems, 222, 224. If only the crankshaft sprockets are phased, then two offset sprockets are placed on crankshaft in a phased relationship. Each chain 222, 224 is connected to a single sprocket 228, 230 on each of the two overhead camshafts. If the camshaft sprockets are also phased, then two offset sprockets are placed on each overhead camshaft in a phased relationship. Four sprockets are then used on the crankshaft. Four chains connect the four sprockets on the crankshaft with the two sprockets on each camshaft. Two of the crankshaft sprockets 232, 234 can be phased by one half pitch with the other two crankshaft sprockets, or all four sprockets can be phased by one quarter pitch. The chain systems include tensioners 236, 238 on the slack side of each chain to maintain chain tension and snubbers 240, 242 on the tight side of each chain to control chain movement during operation.

The components of the phased timing system of FIG. 29 are shown in FIGS. 30, 31, 32, 33 and 34. FIG. 30A shows a left bank sprocket system for operating the overhead camshaft for the left bank of cylinders. The sprocket system 228 is a split sprocket having a first portion 244 and a second portion 246. The portions are preferably phased by one-half pitch. The sprockets are secured to the left bank camshaft and cause its rotation. Two chains 250, 252 are wrapped around the sprockets. The chains may have any one of a number of lacing patterns, including random link lacing patterns. As shown in FIG. 30B, the pins of chains 250, 252 are offset and nested.

A right bank sprocket system operates the right bank camshaft for the right bank of cylinders. The sprocket system also includes two sprockets which are offset or phased by one half pitch. The sprockets are secured to the camshaft for the right bank of cylinders. Two chains are wrapped around the sprockets. The chains are offset by one-half pitch.

Figure 33:
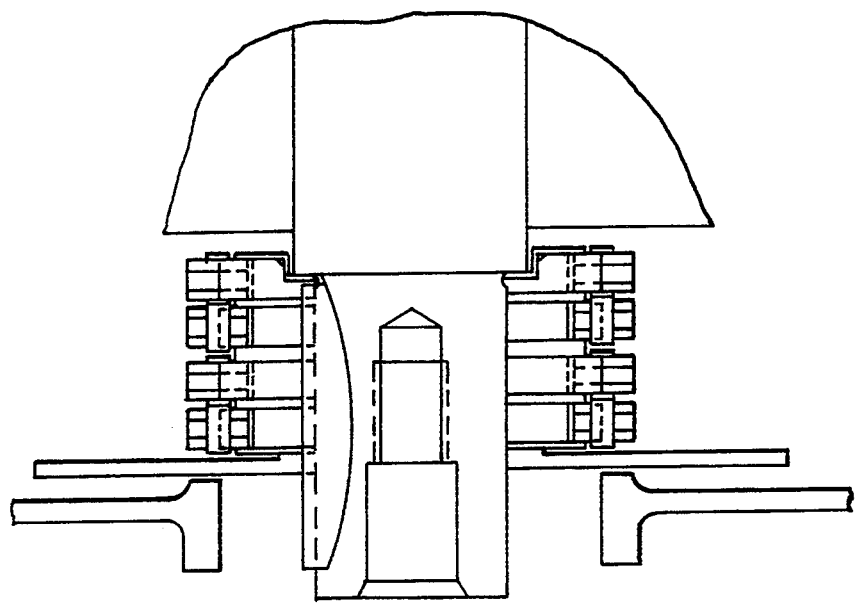
FIG. 33 is sectional view along line C—C from FIG. 32A.
Figure 32B:
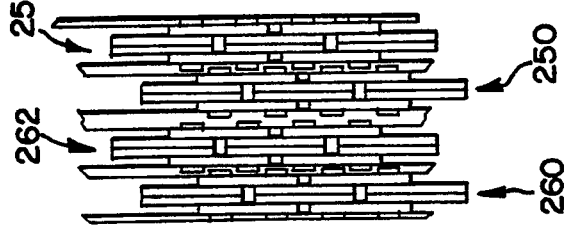
FIG. 32B is top view of the timing chains of FIG. 32A, illustrating the offset of the four chains.
Figure 32A:
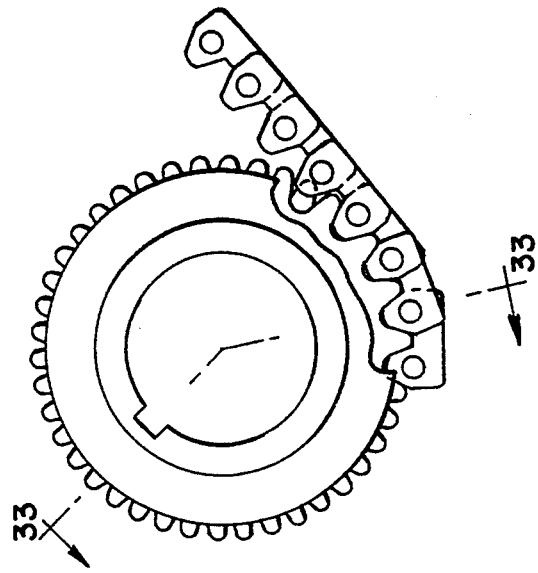
FIG. 32A is a side view of a timing chain and crankshaft sprocket.

The crankshaft, shown in FIGS. 32, 33 and 34, includes four sprockets 256, 257, 258, 259 for the four chains 250, 252, 260, 262. Two sprockets 264, 266 are preferably offset by one-half pitch, and the remaining two sprockets 268, 270 are also offset by one-half pitch.

All four chains are stacked at the front of the engine, with the pins of the chains nested to allow optimum packaging of the system.

The overall system, shown in FIG. 29, includes a pair of tensioners 236, 238 to maintain the chain tension on the slack side of the chain, as well as a pair of snubbers 240, 242 to maintain chain control on the tight side of the chain. The tensioners and snubbers include face portions of extended width to accommodate the pair of chains operating on each side of the system.

In the above-described system, the chains are phased by offsetting the sprockets by one-half pitch. Further phasing modification can be made by determining the initial contact point of each bank's timing chain and then phasing the initial contact point by one-half pitch. Such an approach attempts to phase the impact sound pattern by phasing the initial contact point.

The initial contact point of a particular system will vary engine by engine and is dependent on the engine's geometry. Each bank of cylinders utilizes at least one chain assembly to operate the bank camshaft. Each chain assembly is placed at an angle with respect to the vertical. The angle is dependent on the engine geometry. As a result of this geometry, the two assemblies in a bank-to-bank system form an angle with respect to one another. Unlike a conventional transfer case or transmission application, the chains are in a non-parallel relationship with respect to one another. The angle to the initial contact point of each bank can be approximated by determining the angular difference between the entrance point (estimated as the tangent between the tight strand pitch line and the outside diameter of sprocket) and a reference line located at the center of the nearest tooth past the entrance point. This angular difference provides an indication of the amount of phase inherently provided in the geometry of the system. The initial contact point is defined for purposes of the present invention, and the necessary geometric relationships, to be the tangent between the tight strand pitch line and the outside diameter of the sprocket. The actual initial contact of the teeth will depend on the link geometry as well as the pitch of the chain.

This angular difference provides an adjustment to the offset of the sprockets in order to provide a phasing of the initial contact points of a specified, predetermined amount. Thus, for example, the right hand bank crankshaft sprocket would be rotated by an amount equal to the angle to initial contact plus an amount equal to the desired offset amount of the sprocket pitch length and then rotated in the reverse direction (subtract) an amount of the angular difference. The left bank camshaft sprocket will then need to be rotated by half that amount to retain the initial cam timing. In this manner, the initial contacts of the chain assemblies with the sprockets are phased or offset by a certain portion of the pitch.

Figure 41:
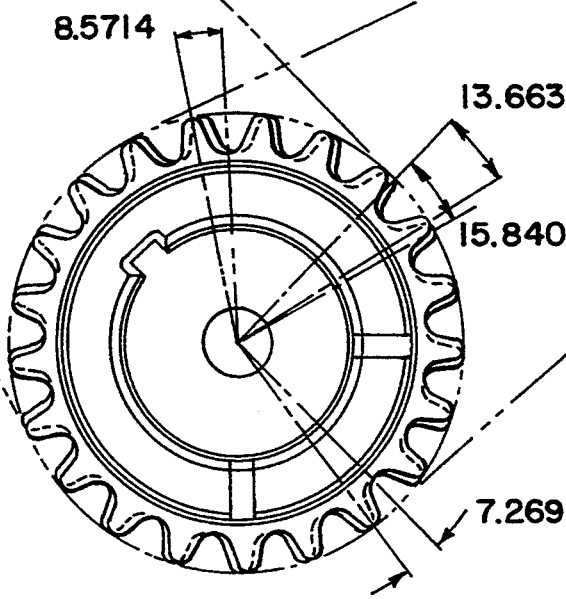
FIG. 41 is a schematic illustrating an example of phased sprockets for single overhead camshafts.

An example of phasing of initial contact points is illustrated in FIG. 41, with reference to the phasing of a sprocket with twenty-one teeth. The distance of offset necessary to achieve phasing of one-half pitch of a twenty-one tooth sprocket is 8.5714 degrees, which is shown in FIG. 41. For the example of FIG. 41, which includes a pair of single overhead camshafts on a 90 degree V-8 engine, the geometric layout finds that the entrance to the crankshaft of the right bank of cylinders is 13.633 degrees from a reference line to the entrance line (rotation is in the clockwise direction). The reference line is located at the center of the nearest tooth that is past the entrance point. The entrance line is defined to be the point of tangency between the tight strand pitch line and the outside diameter of the sprocket. Using this same methodology, the entrance point to the crankshaft sprocket of the left bank of cylinders is at an angle of 7.269 degrees from the reference line, as shown in FIG. 41.

From these two angles, the amount of phase between the two crankshaft sprockets is calculated to be $13.663 - 7.269 = 6.394$ degrees. An angular difference of zero means that the initial contacts are phased with respect to one another as a result of the geometry of the system. In order to offset the sprockets by one-half pitch with respect to one another, the two sprockets must be phased by 8.571 degrees. Thus, in order to phase the initial contacts, the right bank crankshaft sprocket must be rotated clockwise by a total angle of: $13.663 + [8.571 - 6.394] = 15.840$ degrees.

Figure 35:
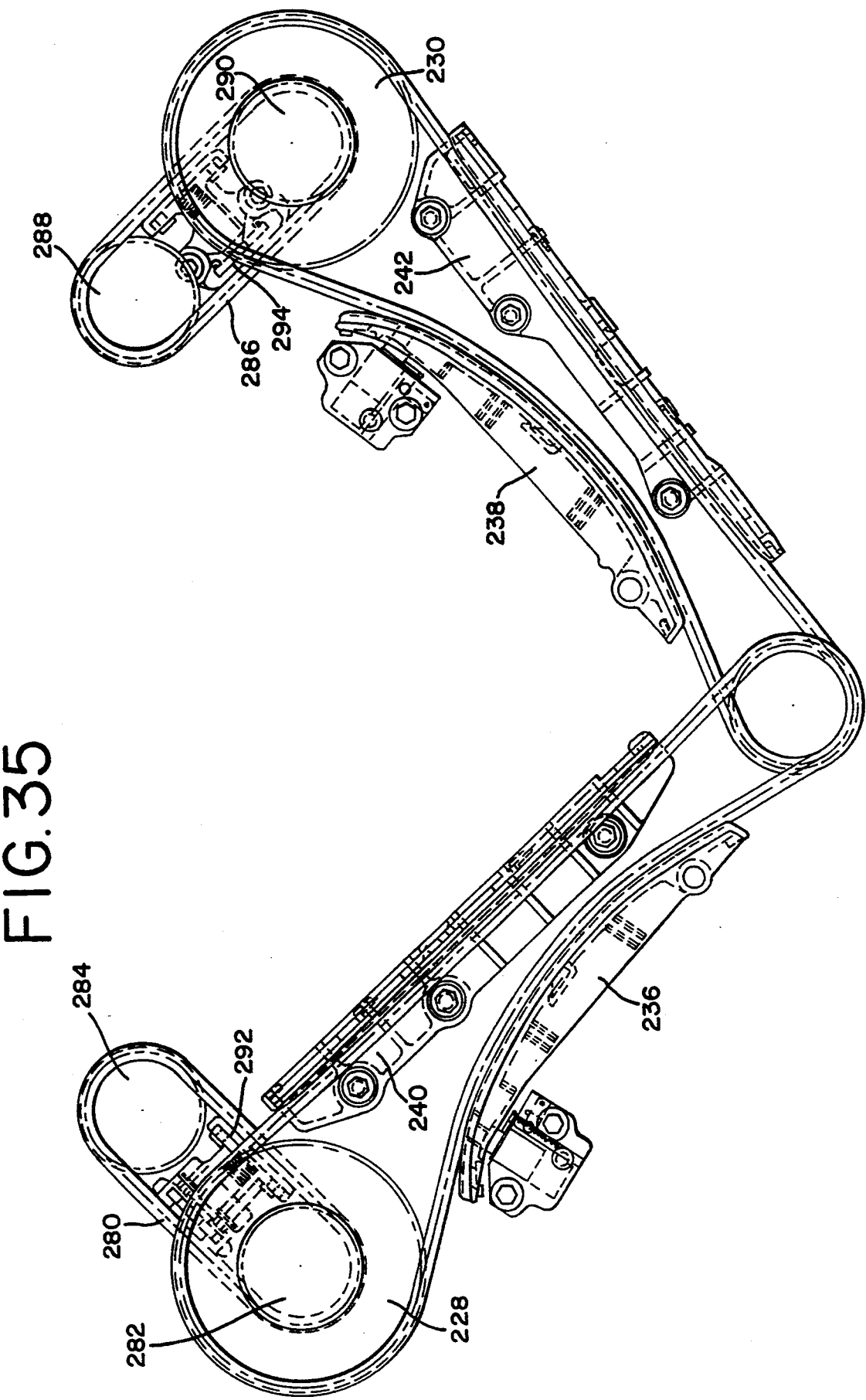
FIG. 35 is schematic illustrating a timing chain system with dual overhead camshafts and a camshaft-to-camshaft drive system.
Figure 36:
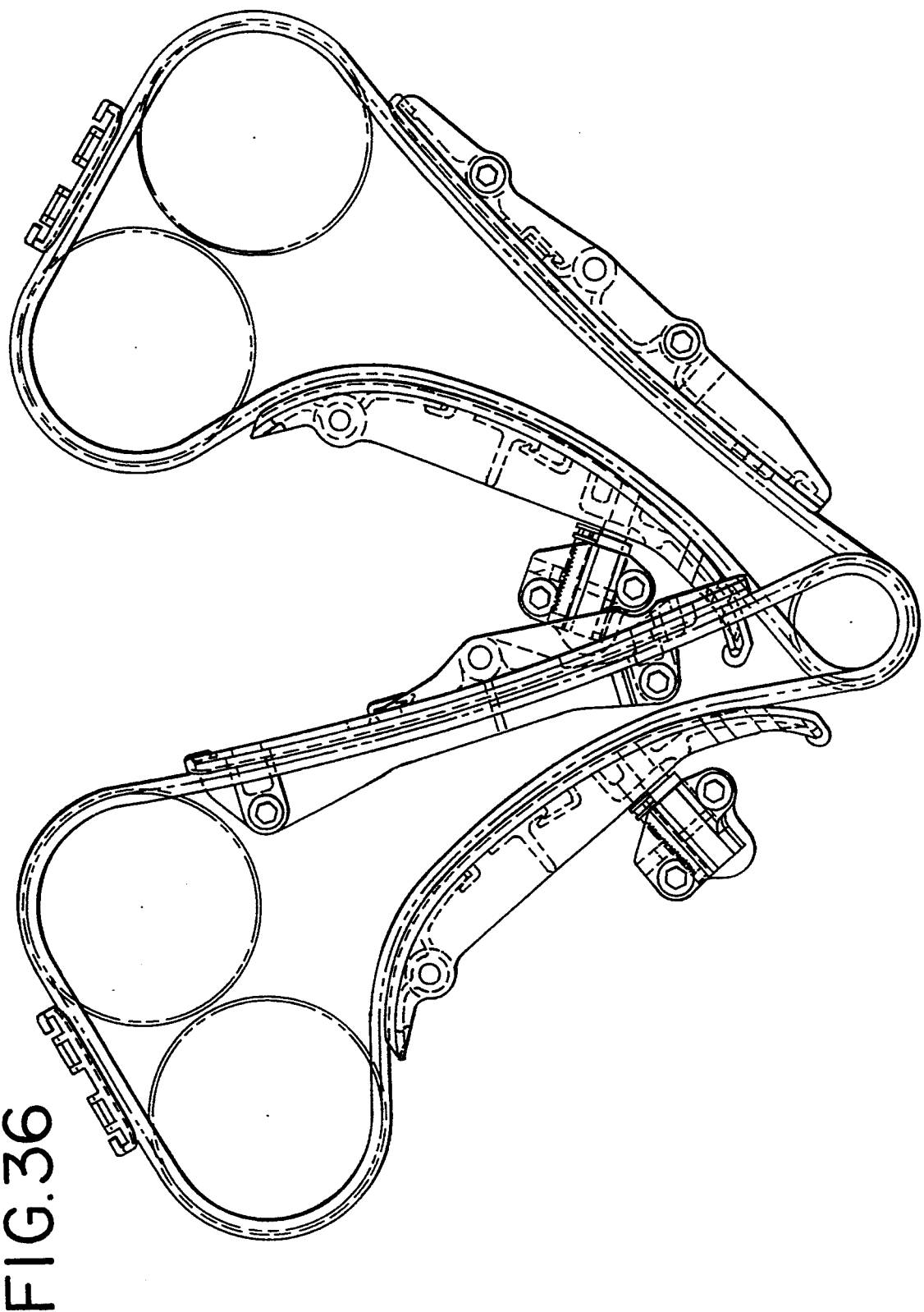
FIG. 36 is a schematic illustrating a timing chain system with dual overhead camshafts and a single chain system for each cylinder bank.

In another embodiment of the present invention, the engine timing systems has two (or dual) overhead camshafts for each bank of cylinders. The dual overhead camshaft timing systems are shown in FIGS. 35 and 36. In the system shown in FIG. 35, the first drive system is similar to the single overhead cam system shown in FIG. 29. The system adds a chain drive, or camshaft-to-camshaft drive, to operate the second camshaft on each bank of cylinders. Thus, chain 280 is wrapped about sprockets 282, 284 and chain 286 is wrapped about sprockets 288, 290. In the cam-to-cam drive system, dual-acting tensioners 292, 294 are included to maintain the chain tension.

In addition to the phasing of the crankshaft to camshaft drive, as described above, the system of FIG. 35 includes phasing of the cam-to-cam drive. A single sprocket can be utilized on each camshaft and that sprocket can be offset or phased with respect to the other camshaft sprocket that is driven by the crankshaft. Alternatively, the cam-to-cam drive can include a pair of sprockets on each camshaft that are phased, and then those sprockets are phased with respect to the other camshaft sprockets.

In this system, as described above, the crankshaft sprockets can be offset to phase initial contacts of the chains. Additionally, the initial contacts of the camshaft sprockets can be phased. Thus, the initial contact of the chain system contacting the camshaft sprocket driven by the crankshaft is phased with the initial contact of the chain system that is driving the second camshaft. These initial contacts can be phased on both camshaft drives.

In the dual overhead cam system of FIG. 36, both camshafts on each bank of cylinders are driven by the same chain system. Thus, the system of FIG. 36 expands the single overhead cam system of FIG. 29 by having an additional camshaft on each bank, and the use of chain of greater center distance to drive both camshafts. Phasing is accomplished is the same manner as described above.

In the various embodiments of the present invention, each single sprocket is replaced by a pair of sprockets that is phased by one-half pitch. Alternatively, the single sprocket can be replaced by three sprockets that are phased by one-third pitch, and then utilized with three chains. Other sprockets are phased so that the initial impacts of the chains with the sprockets are phased. Additional sprockets may be used within the entire system. Other modifications of number of sprockets and degrees of phasing are possible and within the scope of the present invention.

Figure 37:
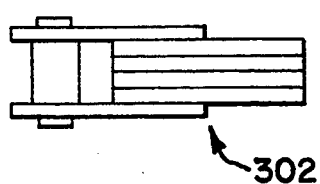
FIG. 37 is a top view of a chain with block laced construction.
Figure 38:
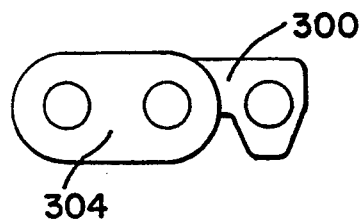
FIG. 38 is a side view of the chain of FIG. 37.

A number of different chain lacings are possible for use in the systems of the present invention. A chain and lacing construction referred to as block lacing is described in U.S. Pat. No. 4,758,210, which is incorporated herein by reference. A block lacing construction is also shown in FIGS. 37 and 38. Rows of inside or articulating links 300, which have inverted teeth constructed to contact the teeth of the sprocket, have the inside links formed in stacks or blocks 302. Rows of inside links 300 are interleaved with rows of guide links 304, which do not have inverted teeth and are constructed to maintain the chain on the sprocket. The chain is constructed by repetition of this lacing, with the inside links being all identical, or of different flank configurations.

Figure 39:
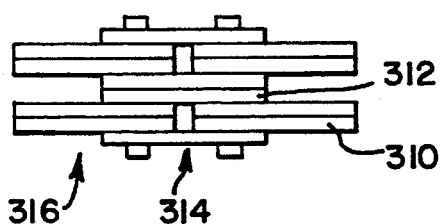
FIG. 39 is a top view of a timing chain illustrating a lacing pattern.

FIG. 39 illustrates another type of lacing for use in the system of the present invention. Pair of inside links 310 are stacked and interleaved with other stacked pairs of links 312. In the guide row 314, only two links are found, which are located in the center of the link. In the non-guide row 316, four links are found, which are located outside of the aforementioned links of the guide row.

Figure 40:
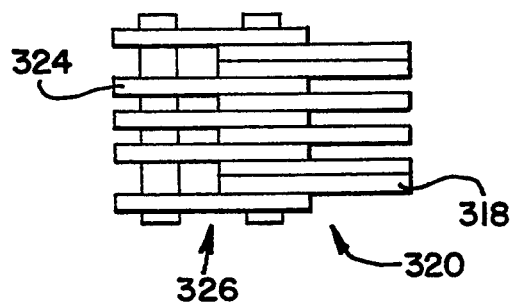
FIG. 40 is a top view of a timing chain illustrating a lacing pattern.

FIG. 40 illustrates another type of lacing for use in the system of the present invention. Pairs of inside links 318 are stacked and placed at the outside of the lacing pattern in the non-guide row 320. These links are then interlaced with single inside links 324 in both the guide 326 and non-guide row 320. This lacing pattern is continued throughout the length of the chain.

Figure 42:
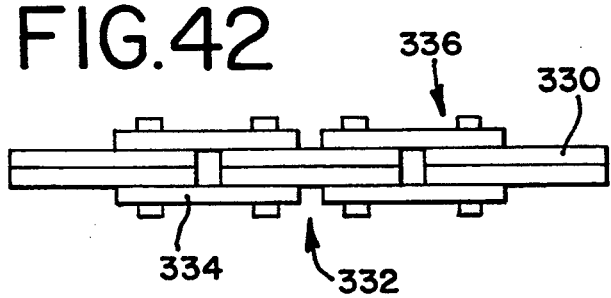
FIG. 42 is a top view of a chain illustrating a lacing pattern.
Figure 43:
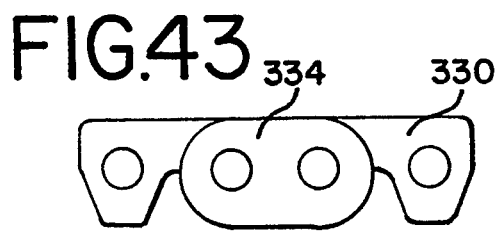
FIG. 43 is a side view of the chain of FIG. 42.

FIGS. 42 and 43 illustrate another type of lacing for use in the system of the present invention. Pairs of inside links 330 are stacked in blocks in the non-guide row 332. Pairs of guide links 334 in the guide row 336 are interlaced with the inside links. No inside links are present in the guide row. This lacing pattern is continued throughout the length of the chain.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A phased chain and sprocket assembly, comprising:
   first and second driving sprockets connected to a single drive shaft, said first and second driving sprockets having a plurality of spaced teeth, said driving sprockets being disposed in parallel relationship along said drive shaft, the location of the teeth of said first driving sprocket being offset with respect to the teeth of said second driving sprocket by a first angular difference,
   first and second driven sprockets connected to separate driven shafts, said first and second driven sprockets having a plurality of spaced teeth,
   said drive shaft being operatively connected to a power input and said driven shaft being operatively connected to a power output,
   said first driving sprocket being aligned with said first driven sprocket and having a first inverted tooth chain assembly drivingly connecting said first driving sprocket with said first driven sprocket, said second driving sprocket being aligned with said second driven sprocket and having a second inverted tooth chain assembly drivingly connecting said second driving sprocket with said second driven sprocket,
   said first and second inverted tooth chain assemblies having a plurality of interleaved sets of inverted tooth links, said links being adapted to contact the teeth of said sprockets, pivot pins connecting adjacent sets of links, each link defining apertures for receiving said pivot pins,
   said first inverted tooth chain assembly having a first initial contact point with said first driving sprocket, said second inverted tooth chain assembly having a second initial contact point with said second driving sprocket,
   said first angular difference being determined so that said first initial contact point and said second initial contact point are offset a specified angular distance with respect to each other.

2. The phased chain and sprocket assembly of claim 1 wherein said first chain assembly has some sets of links of a first configuration and other sets of links of a different configuration, said some sets of links being arranged in a prescribed pattern with said other sets of links.

3. The phased chain and sprocket assembly of claim 1 wherein said first initial contact point is offset from said second initial contact point by approximately one-half pitch.

4. An engine timing system drive, comprising:
   first and second crankshaft sprockets connected to an engine crankshaft, said first and second crankshaft sprockets having a plurality of spaced teeth, said crankshaft sprockets being disposed in parallel relationship along said engine crankshaft, the location of the teeth of said first crankshaft sprocket being offset with respect to the teeth of said second crankshaft sprocket by a first angular difference,
   first and second camshaft sprockets connected to separate camshafts, said first and second camshaft sprockets having a plurality of spaced teeth,
   said first crankshaft sprocket being aligned with said first camshaft sprocket and having a first inverted tooth timing chain assembly drivingly connecting said first crankshaft sprocket with said first camshaft sprocket, said second crankshaft sprocket being aligned with said second camshaft sprocket and having a second inverted tooth timing chain assembly drivingly connecting said second crankshaft sprocket with said second camshaft sprocket,
   said first and second inverted tooth chain assemblies having a plurality of interleaved sets of inverted tooth links, said links being adapted to contact the teeth of said sprockets, pivot pins connecting adjacent sets of links, each link defining apertures for receiving said pivot pins,
   said first chain assembly having a first initial contact point with said first crankshaft sprocket, said second chain assembly having a second initial contact point with said second crankshaft sprocket,
   said first angular difference being adjusted so that said first initial contact point and said second initial contact point are offset a specified angular distance with respect to each other.

5. The timing drive system of claim 4 wherein said first initial contact point is offset from said second initial contact point by approximately one-half pitch.

* * * * *